(12) United States Patent
Fu et al.

(10) Patent No.: US 10,903,656 B2
(45) Date of Patent: *Jan. 26, 2021

(54) MULTILEVEL INVERTER DEVICE AND METHOD

(71) Applicant: Futurewei Technologies, Inc., Plano, TX (US)

(72) Inventors: Dianbo Fu, Frisco, TX (US); Bo He, Shenzhen (CN); Quan Li, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,525

(22) Filed: Aug. 19, 2019

(65) Prior Publication Data
US 2019/0372353 A1    Dec. 5, 2019

Related U.S. Application Data

(60) Continuation of application No. 15/795,794, filed on Oct. 27, 2017, now Pat. No. 10,389,135, which is a
(Continued)

(51) Int. Cl.
*H02M 7/537* (2006.01)
*H02M 7/487* (2007.01)
(Continued)

(52) U.S. Cl.
CPC ............ *H02J 3/383* (2013.01); *H02M 3/156* (2013.01); *H02M 7/487* (2013.01); *H02M 7/537* (2013.01);
(Continued)

(58) Field of Classification Search
CPC ............ H02M 5/40; H02M 5/42; H02M 5/44; H02M 5/453; H02M 5/458; H02M 5/4585; H02M 7/04; H02M 7/12; H02M 7/217; H02M 7/219; H02M 7/42; H02M 7/44; H02M 7/48; H02M 7/483; H02M 7/487; H02M 7/537; H02M 7/5387; H02M 7/53871; H02M 7/5388; H02M 7/797; H02M 2001/007
See application file for complete search history.

(56) References Cited

U.S. PATENT DOCUMENTS 4,203,151 A    5/1980    Baker
6,005,787 A    12/1999    Mizukoshi
(Continued)

FOREIGN PATENT DOCUMENTS

CN    101340159 A        1/2009
CN    102427304 A  *    4/2012    .......... H02M 7/5387
(Continued)

*Primary Examiner* — Thienvu V Tran
*Assistant Examiner* — Ivan Laboy
(74) *Attorney, Agent, or Firm* — Slater Matsil, LLP

(57) ABSTRACT

A system comprises a first five-level inverter connected between a dc power source and an ac grid, a second five-level inverter connected between the dc power source and the ac grid and a third five-level inverter connected between the dc power source and the ac grid, wherein each five-level inverter comprises a first boost apparatus and a second boost apparatus.

19 Claims, 35 Drawing Sheets

Related U.S. Application Data continuation of application No. 15/222,170, filed on Jul. 28, 2016, now Pat. No. 9,806,529, which is a division of application No. 13/468,130, filed on May 10, 2012, now Pat. No. 9,413,268.

(51) Int. Cl.
  *H02M 7/5387* (2007.01)
  *H02J 3/38* (2006.01)
  *H02M 3/156* (2006.01)
  *H02M 3/158* (2006.01)
  *H02M 1/00* (2006.01)

(52) U.S. Cl.
  CPC .......... *H02M 3/158* (2013.01); *H02M 7/5387* (2013.01); *H02M 2001/007* (2013.01)

(56) References Cited

U.S. PATENT DOCUMENTS

| | | | |
|---|---|---|---|
| 6,747,881 B2 | 6/2004 | Schreiber | |
| 6,930,899 B2 | 8/2005 | Bakran et al. | |
| 7,040,391 B2 | 5/2006 | Leuthen et al. | |
| 7,706,163 B2 | 4/2010 | Tan et al. | |
| 8,184,460 B2 | 5/2012 | O'Brien et al. | |
| 9,413,268 B2* | 8/2016 | Fu | H02J 3/383 |
| 9,577,549 B2 | 2/2017 | Rasoanarivo | |
| 9,806,529 B2* | 10/2017 | Fu | H02M 3/156 |
| 10,389,135 B2* | 8/2019 | Fu | H02M 3/156 |
| 2003/0043603 A1 | 3/2003 | Schreiber | |
| 2003/0128563 A1 | 7/2003 | Rojas | |
| 2004/0267468 A1 | 12/2004 | Leuthen et al. | |
| 2007/0274109 A1 | 11/2007 | Oyobe et al. | |
| 2008/0067872 A1 | 3/2008 | Moth | |
| 2008/0197706 A1 | 8/2008 | Nielsen | |
| 2008/0280175 A1 | 11/2008 | Gurunathan et al. | |
| 2009/0244936 A1* | 10/2009 | Falk | H02M 7/487 363/40 |
| 2010/0067264 A1 | 3/2010 | Ohashi et al. | |
| 2010/0302819 A1 | 12/2010 | O'Brien et al. | |
| 2011/0002148 A1 | 1/2011 | Iturriz et al. | |
| 2011/0044077 A1 | 2/2011 | Nielsen | |
| 2011/0051478 A1 | 3/2011 | Sato et al. | |
| 2011/0080147 A1 | 4/2011 | Schoenlinner et al. | |
| 2011/0110136 A1 | 5/2011 | Lacarnoy | |
| 2011/0116293 A1 | 5/2011 | Tabata et al. | |
| 2011/0170322 A1 | 7/2011 | Sato et al. | |
| 2011/0286249 A1 | 11/2011 | Torrico-Bascope | |
| 2011/0291737 A1 | 12/2011 | Kshirsagar | |
| 2012/0163057 A1* | 6/2012 | Permuy | H02M 7/487 363/131 |
| 2012/0243273 A1 | 9/2012 | Rasoanarivo | |
| 2013/0063070 A1 | 3/2013 | Zhang et al. | |
| 2013/0094260 A1 | 4/2013 | Martini et al. | |
| 2013/0099571 A1* | 4/2013 | Bremicker | H02M 1/32 307/43 |
| 2013/0107599 A1 | 5/2013 | Shekhawat et al. | |
| 2013/0235628 A1 | 9/2013 | Dong et al. | |
| 2013/0302819 A1 | 11/2013 | Kilty et al. | |
| 2014/0307489 A1 | 10/2014 | Kidera et al. | |
| 2014/0334199 A1 | 11/2014 | He et al. | |
| 2015/0131348 A1 | 5/2015 | Rasoanarivo | |
| 2016/0268839 A1 | 9/2016 | Mouridsen | |
| 2017/0054383 A1 | 2/2017 | Mouridsen | |

FOREIGN PATENT DOCUMENTS

| | | |
|---|---|---|
| CN | 102427304 A | 4/2012 |
| CN | 102437759 A | 5/2012 |
| CN | 102891611 A | 1/2013 |
| CN | 102904471 A | 1/2013 |
| CN | 103023363 A | 4/2013 |
| DE | 102006010694 A1 | 9/2007 |
| WO | 2011132206 A1 | 10/2011 |
| WO | 2012069646 A1 | 5/2012 |
| WO | 2014082221 A1 | 6/2014 |

* cited by examiner

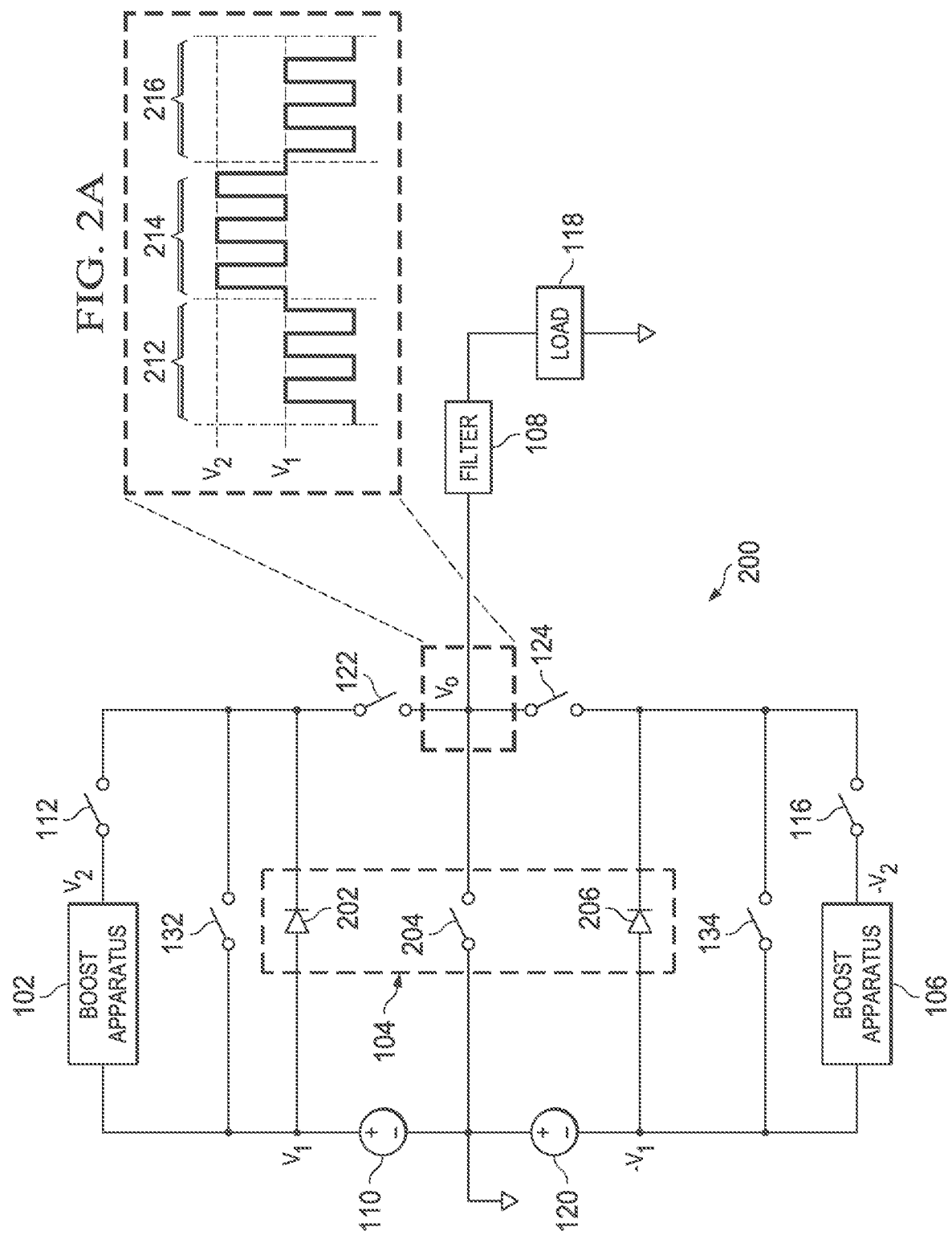

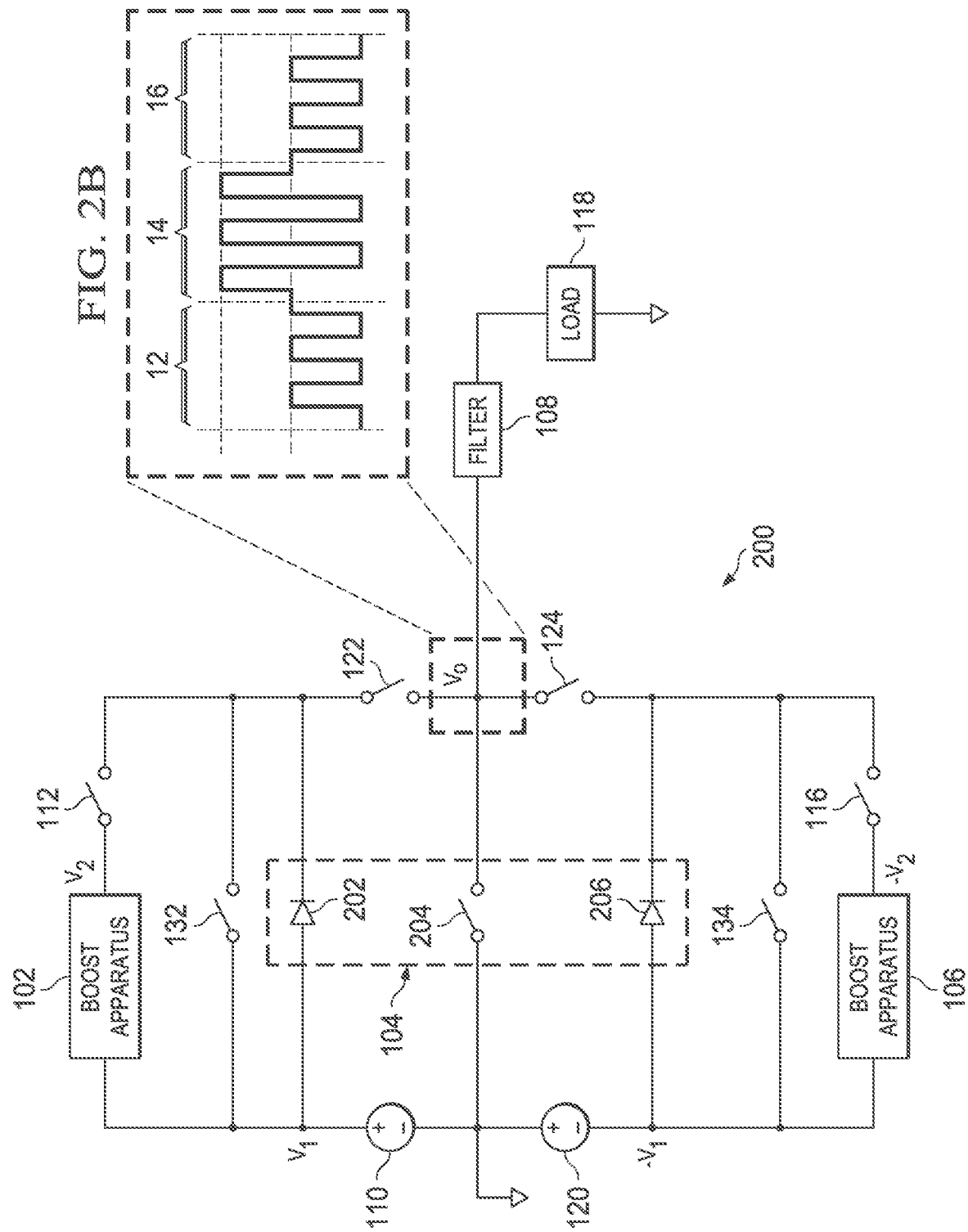

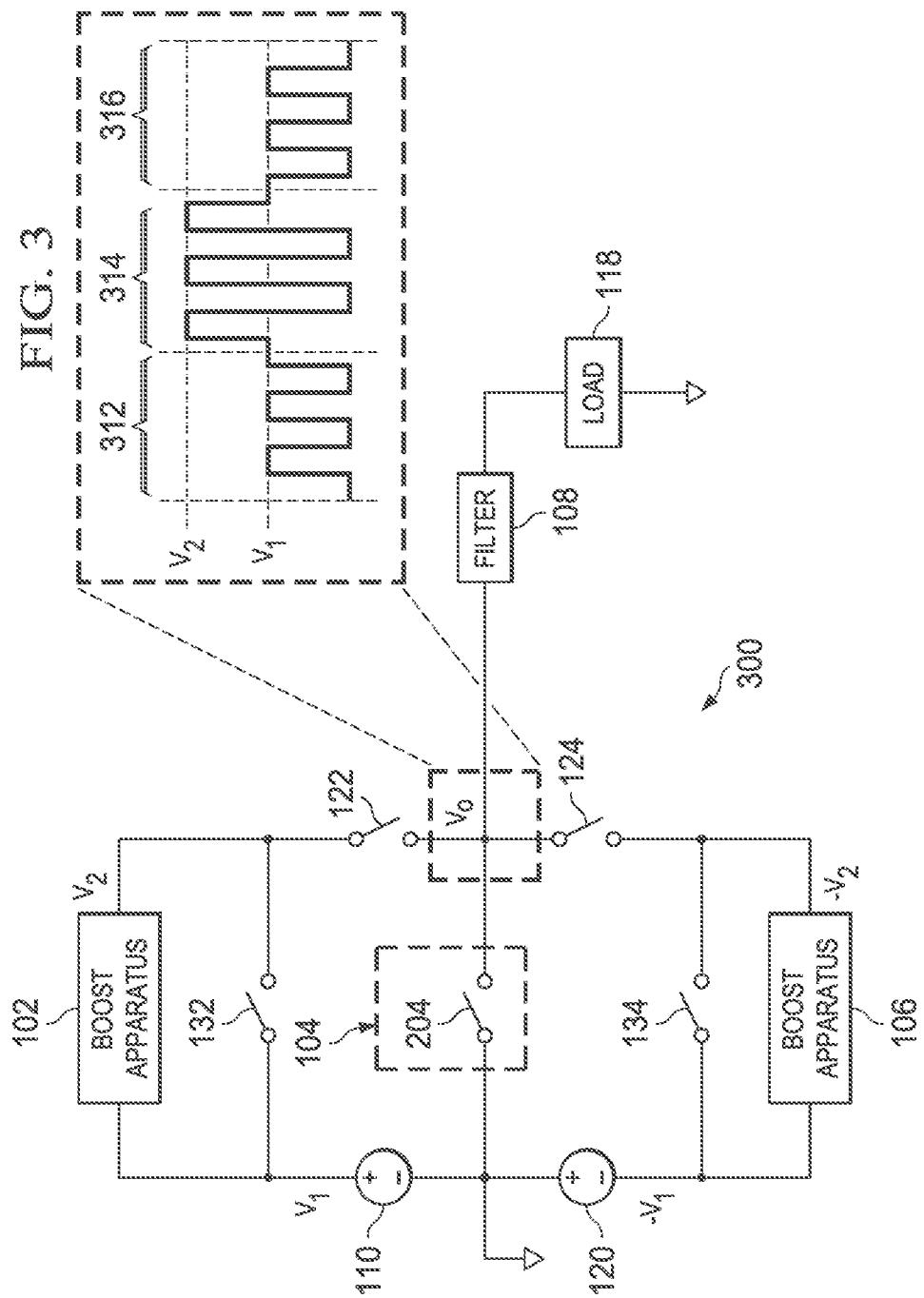

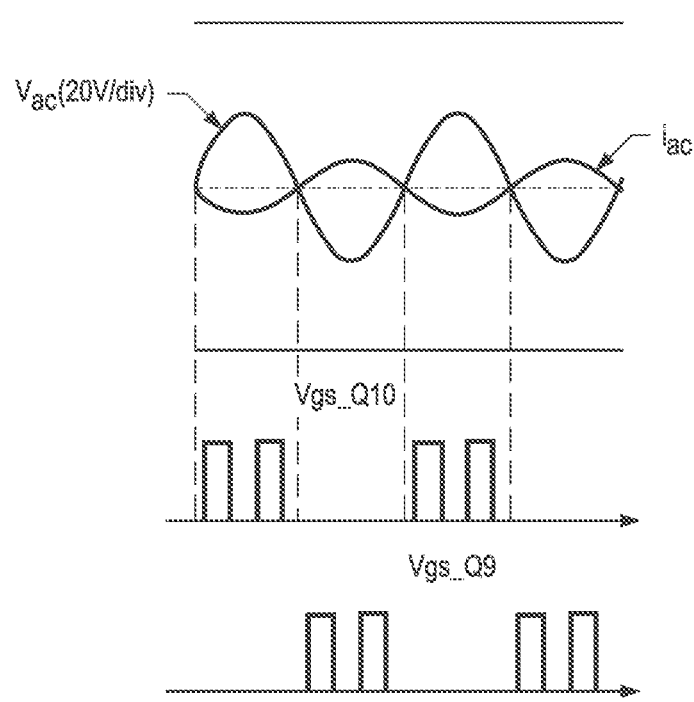

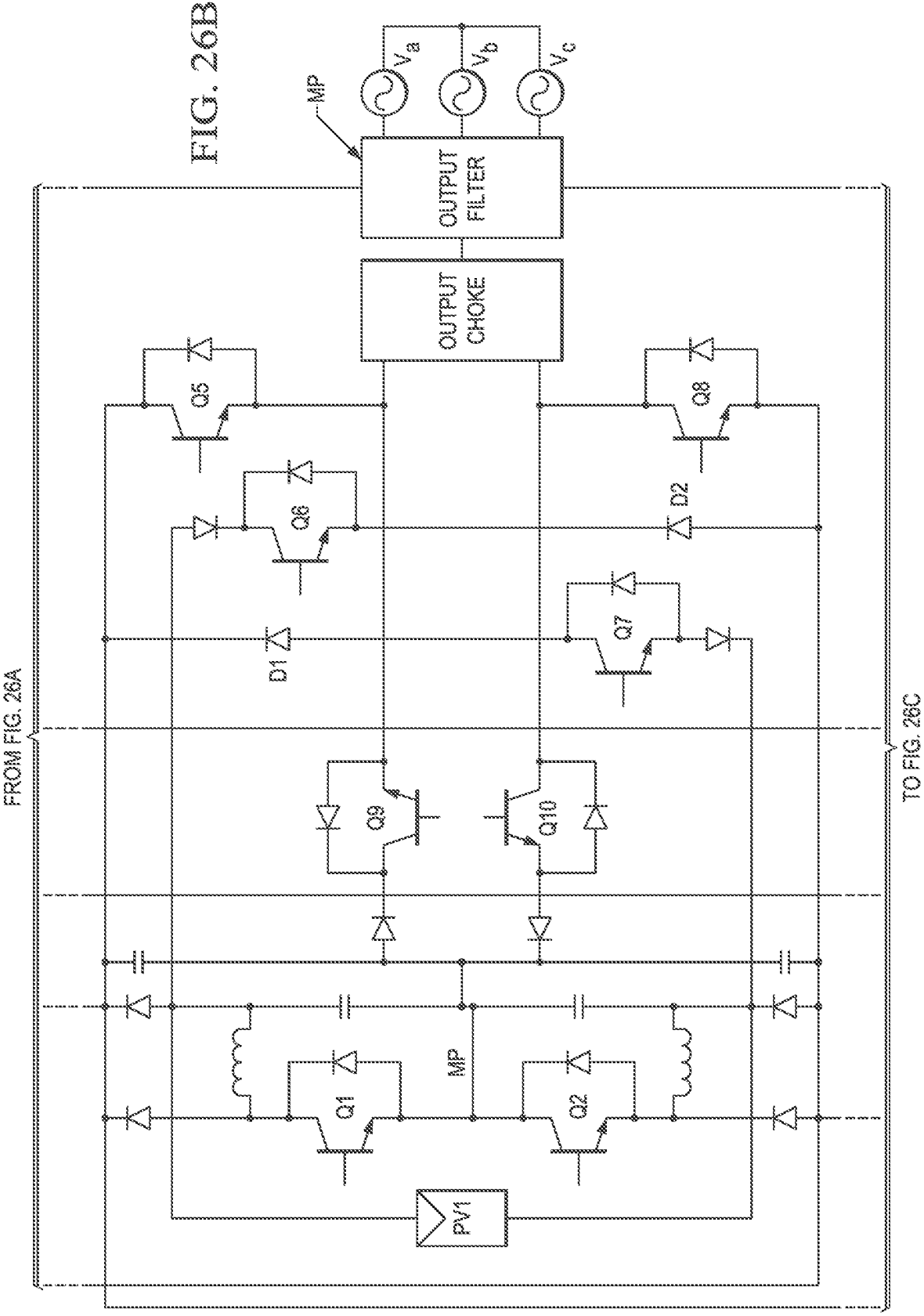

MULTILEVEL INVERTER DEVICE AND METHOD

This application is a continuation of U.S. patent application Ser. No. 15/795,794, filed on Oct. 27, 2017, entitled "Multilevel Inverter Device and Method", which is a continuation of U.S. patent application Ser. No. 15/222,170, filed on Jul. 28, 2016, entitled "Multilevel Inverter Device and Method", now U.S. Pat. No. 9,806,529 issued Oct. 31, 2017, which is a divisional of U.S. patent application Ser. No. 13/468,130, filed on May 10, 2012, entitled "Multilevel Inverter Device and Method", now U.S. Pat. No. 9,413,268 issued Aug. 9, 2016, each application is incorporated herein by reference.

TECHNICAL FIELD

The present invention relates to a multilevel inverter device and method, and, in particular embodiments, to a five-level inverter device and method for solar applications.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of multilevel inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

The diode clamped multilevel inverter is commonly referred to as a three-level neutral point clamped (NPC) inverter. A three-level NPC inverter requires two series connected capacitors coupled between the input dc buses. Each capacitor is charged to an equal potential. Furthermore, the three-level NPC inverter may comprise four switching elements and two clamping diodes. The clamping diodes help to reduce the voltage stress on the switching element to one capacitor voltage level.

An NPC inverter utilizes a staircase waveform to generate an ac output. Such a staircase waveform resembles a desired sinusoidal waveform. As a result, the output voltage of the NPC inverter may be of a low total harmonic distortion (THD). In addition, the staircase waveform may reduce the voltage stresses. As a result, the electromagnetic compatibility (EMC) performance of the NPC inverter may be improved. In addition, to achieve the same THD, the NPC inverter may operate at a lower switching frequency. Such a lower switching helps to reduce switching losses so as to achieve an efficient power conversion system.

SUMMARY OF THE INVENTION

These and other problems are generally solved or circumvented, and technical advantages are generally achieved, by preferred embodiments of the present invention which provide an apparatus of multilevel inverters in solar applications.

In accordance with an embodiment, a system comprises a first five-level inverter connected between a dc power source and an ac grid, a second five-level inverter connected between the dc power source and the ac grid and a third five-level inverter connected between the dc power source and the ac grid, wherein each five-level inverter comprises a first boost apparatus and a second boost apparatus.

In accordance with yet another embodiment, a system comprises a first five-level inverter connected between a dc power source and an ac grid through an output filter, a second five-level inverter connected between the dc power source and the ac grid through the output filter and a third five-level inverter connected between the dc power source and the ac grid through the output filter, wherein each five-level inverter comprises a first boost apparatus and a second boost apparatus, and a neutral point of the output filter is connected to a common node of two output capacitors of the dc power source.

In accordance with yet another embodiment, a method comprises providing three five-level inverters connected between a dc power source and an ac grid through an L-C filter, wherein each five-level inverter comprises a first boost apparatus and a second boost apparatus, switching a voltage at the input of the L-C filter back and forth between a positive dc bus of the dc power source and ground during a first time period of a half switching cycle, switching the voltage at the input of the L-C filter back and forth between an output voltage of the first boost apparatus and ground during a second time period of the half switching cycle and switching the voltage at the input of the L-C filter back and forth between the positive dc bus and ground during a third time period of the half switching cycle, wherein the second time period is between the first time period and the third time period.

An advantage of an embodiment of the present invention is generating a staircase waveform using a multilevel inverter. Such a staircase waveform helps to reduce the THD as well as voltage stresses of a solar inverter so as to improve the efficiency, reliability and cost of the solar inverter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A illustrates a block diagram of a five-level inverter system in accordance with an embodiment;

FIG. 2B illustrates a block diagram of a five-level inverter system in accordance with an embodiment;

FIG. 3 illustrates a block diagram of a five-level inverter system in accordance with another embodiment;

FIG. 20B illustrates a timing diagram of the multilevel inverter shown in FIG. 20A when the multilevel inverter operates in a reactive power process;

FIG. 26A, FIG. 26B and FIG. 26C illustrate a schematic diagram of a three phase multilevel inverter in accordance with an embodiment.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a five-level inverter. The invention may also be applied, however, to a variety of power converters including multi-level rectifiers, multilevel inverters, multilevel ac-to-ac converters and the like. Furthermore, the invention may also be applied to a variety of three-phase multilevel inverters.

Figure 1A:
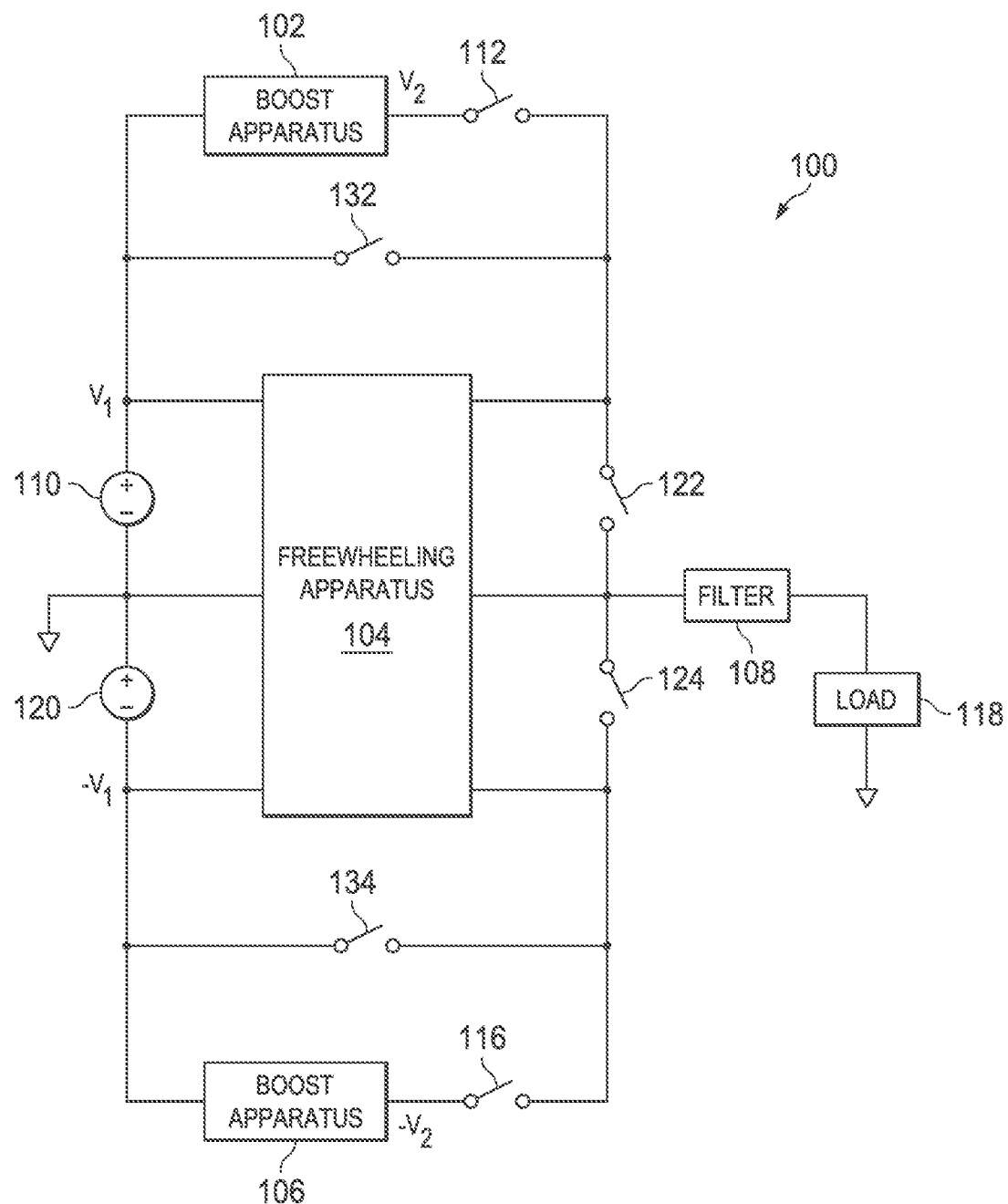
FIG. 1A illustrates a block diagram of a multilevel inverter system in accordance with an embodiment.

Referring initially to FIG. 1A, a block diagram of a multilevel inverter system is illustrated in accordance with an embodiment. The multilevel inverter system 100 comprises a first input dc source 110 having an output voltage $V_1$, a second input dc source 120 having an output voltage $-V_1$, a first boost apparatus 102 having an output voltage $V_2$, a second boost apparatus 106 having an output voltage $-V_2$ and a freewheeling apparatus 104. The first boost apparatus 102 and the second boost apparatus 106 are coupled to the first input dc source 110 and the second input dc source 120 respectively. In addition, the first boost apparatus 102 and the second boost apparatus 106 convert the output voltages of the first input dc source 110 and the second input dc source 120 to $V_2$ and $-V_2$ respectively.

The multilevel inverter system 100 may further comprise an output filter 108, a load 118 and a plurality of switches 112, 122, 124, 116, 132 and 134. In accordance with an embodiment, the switches (e.g., switch 122) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

Each switch is configured such that a staircase waveform is generated at the input of a filter 108 by using different combinations of the switches. In particular, when both the switches 112 and 122 are turned on, the output voltage $V_0$ is coupled to the output of the first boost apparatus 102. As a result, the output voltage $V_0$ has a voltage potential of $V_2$. In contrast, when the switching element 112 is turned off, the output voltage is of a voltage potential of $V_1$ through the freewheeling apparatus 104. The detailed operation of the multilevel inverter 100 will be described below with respect to FIGS. 2-7.

The boost apparatus 102 and the boost apparatus 106 may be implemented by using step up circuits such as boost dc/dc converters. A boost dc/dc converter is formed by an input inductor, a low side switch and a blocking diode. The detailed configuration of the boost dc/dc converter will be described below with respect to FIGS. 4 and 6. It should be noted that boost dc/dc converters are merely an example to implement the first boost apparatus 102 and the second boost apparatus 106. Other boost topologies are also within the contemplated scope of the invention. A boost dc/dc converter is simply one manner of generating a higher voltage from the input dc source (e.g., $V_1$) and that other and alternate embodiment boost topologies could be employed (such as employing a switched capacitor voltage doubler) and that other circuits, (e.g., a charge pump voltage doubler, etc.) could be employed for this function.

It should further be noted that while FIG. 1A illustrates the multilevel inverter system 100 with two boost apparatuses (e.g., the first boost apparatus 102 and the second boost apparatus 106), the multilevel inverter system 100 could accommodate any number of boost apparatuses. The number of boost apparatuses illustrated herein is limited solely for the purpose of clearly illustrating the inventive aspects of the various embodiments. The present invention is not limited to any specific number of boost apparatuses. One of ordinary skill in the art would recognize many variations, alternatives, and modifications. For example, additional boost apparatuses may be employed to achieve an output staircase waveform having additional voltage levels.

In sum, FIG. 1A illustrates a method of operating a five-level inverter comprising generating a first voltage higher than an input positive dc bus by using a first boost apparatus, generating a second voltage lower than an input negative dc bus by using a second boost apparatus, forming a five level input voltage source using the first voltage, the input positive dc bus, ground, the input negative dc bus and the second voltage and configuring a plurality of switches to generate an ac waveform, wherein the plurality of switches are coupled to the five level input voltage source.

The method further comprises generating the first voltage using a first boost dc/dc converter and generating the second voltage using a second boost dc/dc converter. In addition, the method comprises connecting a first switch between an input of an L-C filter and the first boost apparatus, connecting a second switch between the input of the L-C filter and the second boost apparatus, connecting a third switch between the input positive dc bus and the first switch, connecting a fourth switch between the input negative dc bus and the second switch and connecting an isolation switch between the input of the L-C filter and ground.

Figure 1B:
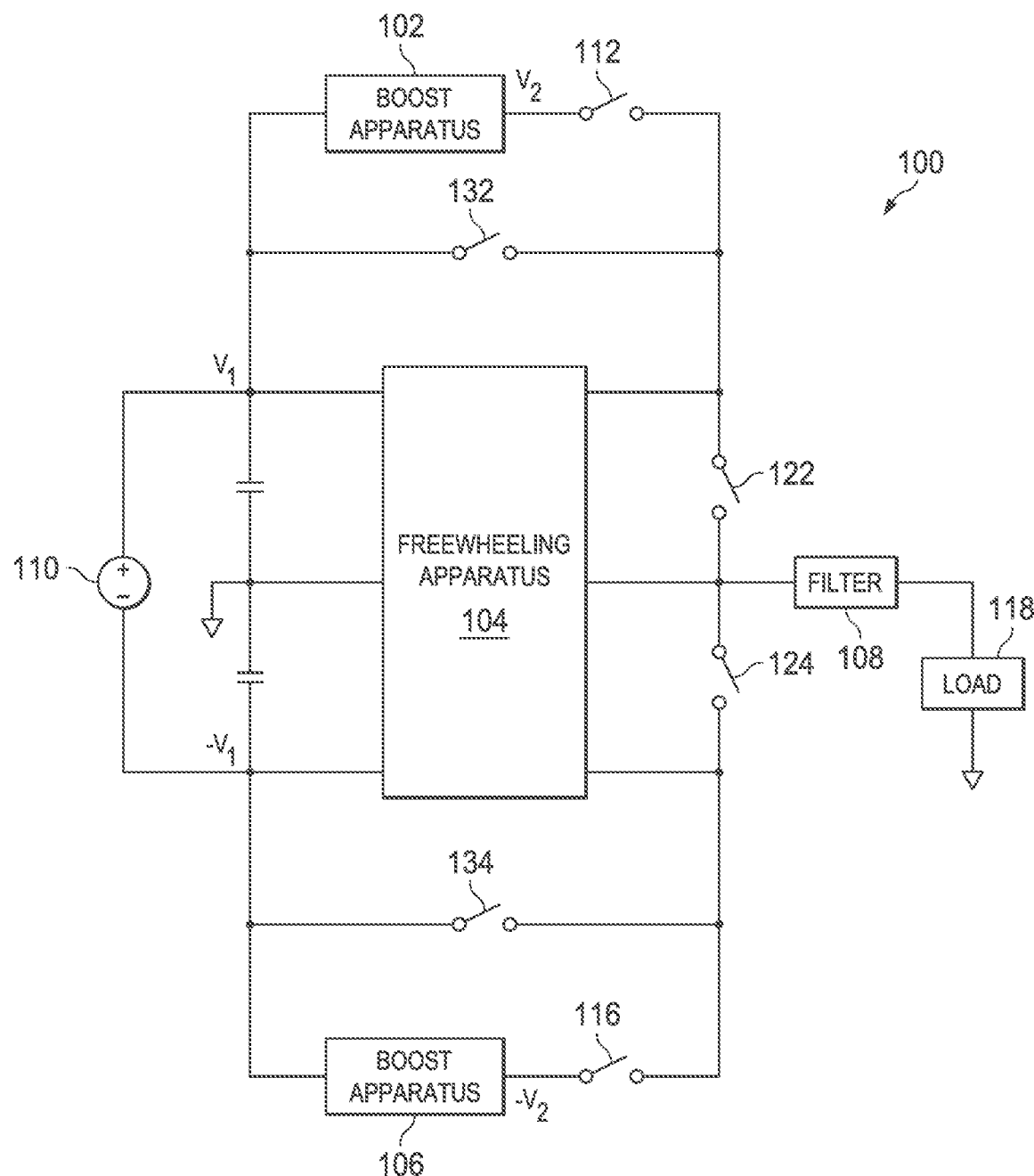
FIG. 1B illustrates a block diagram of a multilevel inverter system in accordance with another embodiment.

FIG. 1B illustrates a block diagram of a multilevel inverter system in accordance with another embodiment. The block diagram of FIG. 1B is similar to the block diagram of FIG. 1A except that a single input power source is employed to provide power for the multilevel inverter system. The detailed description of the multilevel inverter system has been discussed above with respect to FIG. 1A, and hence is not discussed herein to avoid unnecessary repetition.

FIG. 2A illustrates a block diagram of a five-level inverter system in accordance with an embodiment. As shown in FIG. 2A, the freewheeling apparatus 104 may comprises a first freewheeling diode 202, a first freewheeling switch 204 and a second freewheeling diode 206. The five-level inverter 200 further comprises a first boost apparatus 102 generating an output voltage $V_2$ higher than the input voltage $V_1$ from the input dc source 110. Moreover, a second boost apparatus 106 is employed to generate a negative voltage $-V_2$.

It should be noted that while FIG. 2A illustrates the switch 132 and the first freewheeling diode 202 are two separate devices. One skilled in the art will recognize that there may be many variations, alternatives, and modifications. For example, when the switch 132 is a MOSFET device, the body diode of the MOSFET device 132 can be used to replace the first freewheeling diode 202. Alternatively, a controllable switching element can be used to replace the first freewheeling diode 202 by emulating diode operation.

FIG. 2A further includes the output waveform of the five-level inverter 200 to illustrate the operation of the five-level inverter 200. One skilled in the art will recognize that the output voltage is symmetrical at the 180° axis. In other words, the waveform of the second half cycle is merely inverted from that of the first half cycle with the same spacing. For simplicity, only the first half cycle of the output voltage $V_0$ is illustrated in accordance with an embodiment. As shown in FIG. 2A, the first half cycle of the output voltage is a staircase waveform comprising three voltage potentials 0, $V_1$ and $V_2$. Moreover, in the first half cycle, the output voltage $V_0$ is symmetrical about the 90° axis.

In accordance with an embodiment, the first boost apparatus 102 generates an output voltage $V_2$ higher than the input voltage $V_1$ from the first input dc source 110. Likewise, the second boost apparatus 106 generates an output voltage $-V_2$ lower than the input voltage $-V_1$ from the second input dc source 120. In accordance with an embodiment, $V_2$ is approximately equal to $2 \cdot V_1$. A controller (not shown) may be employed to generate gate drive signals in accordance with the operation principles of five-level inverters. In particular, the controller controls the turn-on and turn-off of each switch (e.g., switch 122) so as to achieve the staircase waveform shown in FIG. 2A.

The staircase waveform shown in FIG. 2A can be further divided into three portions, namely portions 212, 214 and 216. During the first portion 212, the output voltage comprises a plurality of pulses switches from 0V to $V_1$. When both the switch 132 and the switch 122 are turned on, the output is coupled to $V_1$ directly so that the output generates $V_1$. On the other hand, when the switch 132 is turned off, the first freewheeling switch 204 is turned on to conduct a freewheeling current. As a result, the output is coupled to ground. As such, the complementary operation of the switch 132 and the first freewheeling switch 204 forms the pulses of the first portion 212 of the five-level PWM. It should be noted that during the first portion 212 of the five-level PWM, the switch 112 is turned off so that the output is free from the higher output voltage $V_2$ of the first boost apparatus 102.

When the five-level inverter operates at the second portion 214 of the staircase waveform shown in FIG. 2A, the output voltage $V_O$ switches back and forth between $V_1$ and $V_2$. In particular, when the switch 112 is turned on, the output voltage $V_O$ is coupled to the output of the first boost apparatus 102. Because $V_2$ is higher than $V_1$, the output voltage generates one more step having a voltage potential $V_2$. When the switch 112 is turned off, the first freewheeling diode 202 is forward biased to form a freewheeling channel between the output $V_O$ and $V_1$. As a result, the output voltage stays at $V_1$ during the freewheeling period.

The third portion 216 and the first portion 212 are similar because they are symmetrical about the 90° axis. In order to avoid unnecessary repetition, the detailed operation during the third portion 216 is not described in further detail herein. It should be noted that the operation of the second half cycle is similar to the first half cycle except that the switch 124 is always on and the switch 122 is always off during the second half cycle. One advantageous feature of having a multilevel inverter such as a five-level inverter shown in FIG. 2A is that the staircase waveform shown in FIG. 2A resembles a sinusoidal waveform. Therefore, the five-level inverter 200 may generate an ac waveform with low distortion. The low distortion helps to achieve a low THD for the five-level inverter 200. Such a low THD helps to reduce the size of the output filter 108.

FIG. 2B illustrates a block diagram of a five-level inverter system in accordance with an embodiment. The timing diagram of FIG. 2B is similar to that of FIG. 2A except that the timing diagram of the second portion 14 is different from the timing diagram of the second portion 214 shown in FIG. 2A. In particular, when the five-level inverter operates at the second portion 14 of the staircase waveform shown in FIG. 2B, the output voltage $V_O$ switches back and forth between ground and $V_2$.

FIG. 3 illustrates a block diagram of a five-level inverter system in accordance with another embodiment. The system configuration of the five-level inverter system 300 is similar to the five-level inverter system 200 shown in FIG. 2A except that the switches 112 and 116 (not shown but illustrated in FIG. 2A) are removed. As a consequence, the outputs of the first boost apparatus 102 and the second boost apparatus 106 are coupled to the output of the inverter through switches 122 and 124 respectively.

In order to prevent the first boost apparatus 102 from interfering with the output of the five-level inverter 300, the first boost apparatus 102 is turned off during the first portion 312. In addition, during the transition from a higher voltage level (e.g., portion 314) to a lower voltage level (e.g., portion 316), the first boost apparatus 102 is turned off first and the switch 132 may not be turned on until the output capacitor (not shown but illustrated in FIG. 6A) of the first boost apparatus 102 is discharged to a level approximately equal to $V_1$. In comparison with the system configuration shown in FIG. 2A, an advantageous feature of removing the switches 112 and 116 (shown in FIG. 2A) is that the conduction losses of the switches 112 and 116 can be saved so that the total efficiency of the five-level inverter system 300 is improved.

Figure 4A:
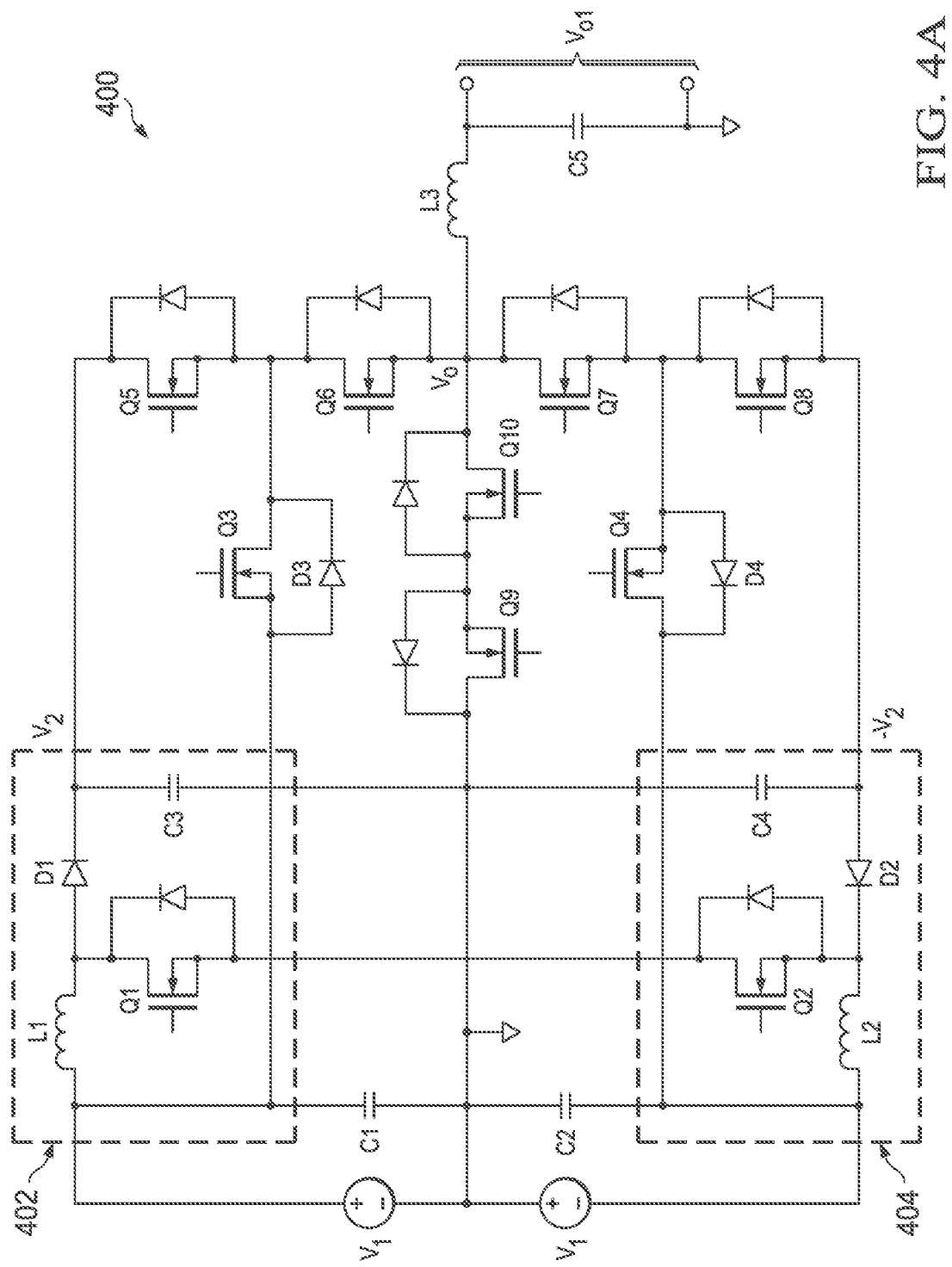
FIGS. 4A illustrates a schematic diagram of the five-level inverter system shown in FIG. 2A in accordance with an embodiment.

FIG. 4A illustrates a schematic diagram of the five-level inverter system shown in FIG. 2A in accordance with an embodiment. The first boost apparatus 102 is implemented by a first boost dc/dc converter 402. Likewise the second boost apparatus 106 is implemented by a second boost dc/dc converter 404. As shown in FIG. 4A, the first boost dc/dc converter 402 is formed by an input inductor L1, a low side switch Q1, a blocking diode D1 and an output capacitor C3. A controller (not shown) may control the turn-on duty cycle of the low side switch Q1 so as to regulate the output voltage across the output capacitor C3. The detailed operation principles of boost dc/dc converters are well known in the art, and hence are not discussed in further detail to avoid unnecessary repetition.

FIG. 4A further comprises a plurality of switches connected between the output $V_O$ of the five-level inverter 400 and the multilevel input dc sources. More particularly, switches Q6 and Q7 are controlled by a pair of control signals complementary to each other. During the first half cycle of a period, switch Q6 is turned on and switch Q7 is turned off. As a result, the output of the boost dc/dc converter 402 as well as the output of the first dc source no may be connected to the output of the five level inverter 400 by turning on switches Q5 and Q3 respectively. Likewise, switch Q7 is turned on during the second half cycle of a period. Switches Q4 and Q8 may be turned on and off to generate $-V_1$ and $-V_2$ respectively during the second half cycle.

Both switch Q3 and switch Q4 may be a dual-function device. When switch Q3 and switch Q4 are implemented by MOSFET devices, the body diodes of switches Q3 and Q4 can be used to provide a freewheeling channel. It should be noted that when switches Q3 and Q4 are implemented by IGBT devices, a separate freewheeling diode is required to be connected in parallel with its corresponding switch. The operation of switches Q3 and Q4 will be described below with respect to FIG. 5A.

Switches Q9 and Q10 are connected in series to form an isolation switch between the output of five-level inverter and ground. More particularly, when the five-level inverter 400 operates in the second half cycle of a period, the isolation switch formed by Q9 and Q10 helps to isolate the negative output voltage from the dc input ground. It should be noted that the isolation switch formed by a back-to-back connected switch is merely an example, which should not unduly limit the scope of the claims. One of ordinary skill in the art would recognize many variations, alternatives and modifications. For example, a bidirectional isolation switch can be formed by a common emitter bidirectional switch. The common emitter bidirectional switch may comprise two diodes and two IGBT devices. The diodes and IGBT devices are connected in an anti-parallel arrangement. Alternatively, the isolation switch may be implemented by a common collector bidirectional switch. Furthermore, the isolation switch may be implemented by some new semiconductor switches such as anti-paralleled reverse blocking IGBTs arrangement.

Figure 4B:
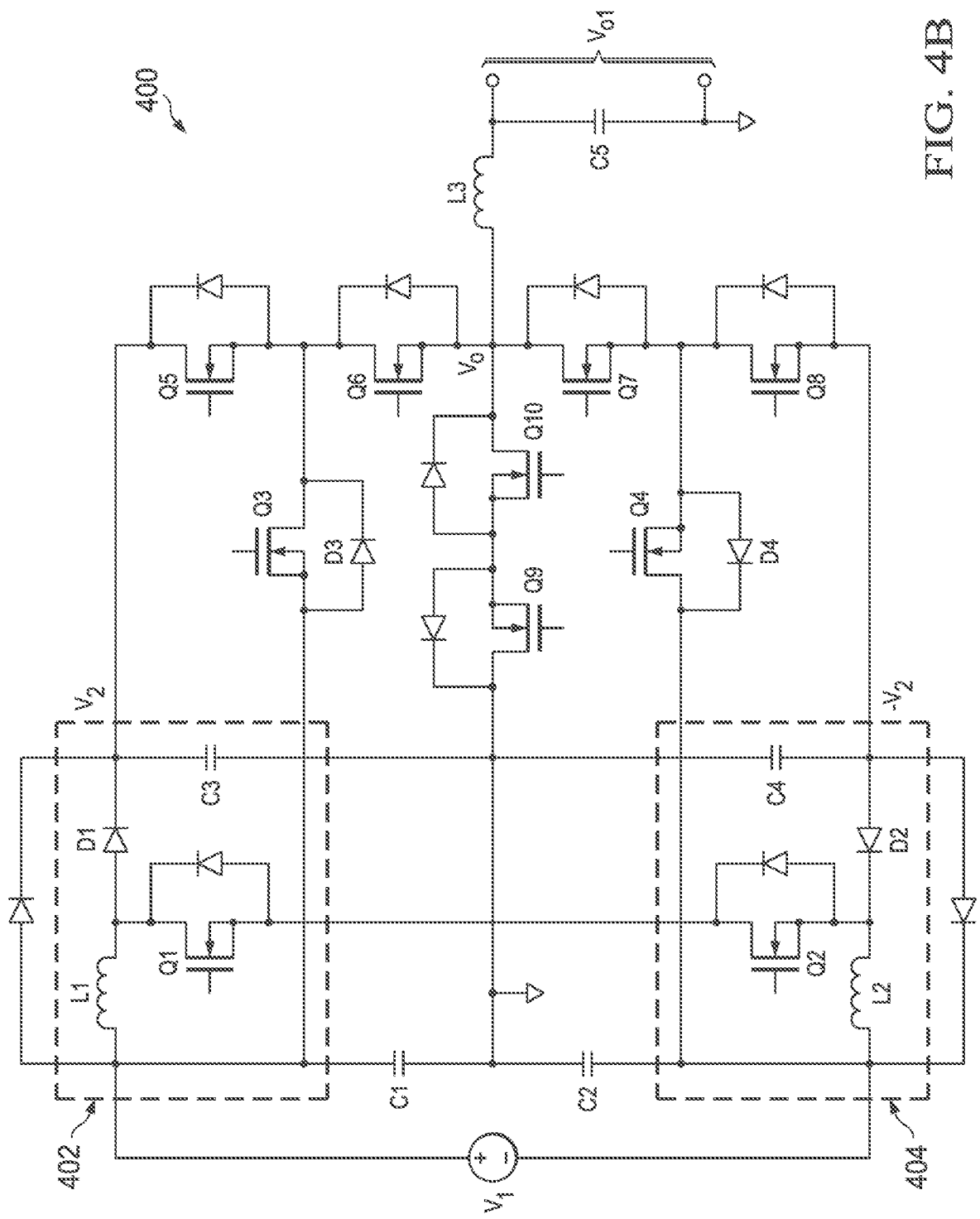
FIG. 4B illustrates a schematic diagram of the five-level inverter system shown in FIG. 2A in accordance with another embodiment.

FIG. 4B illustrates a schematic diagram of the five-level inverter system shown in FIG. 2A in accordance with another embodiment. The schematic diagram of FIG. 4B is similar to the schematic diagram of FIG. 4A except that a single input power source is employed to provide power for the multilevel inverter system. In addition, two bypass diodes are employed to facilitate the operation of the five-level inverter system when the boost converters do not work. The detailed description of the multilevel inverter system has been discussed above with respect to FIG. 4A, and hence is not discussed herein to avoid unnecessary repetition.

Figure 5A:
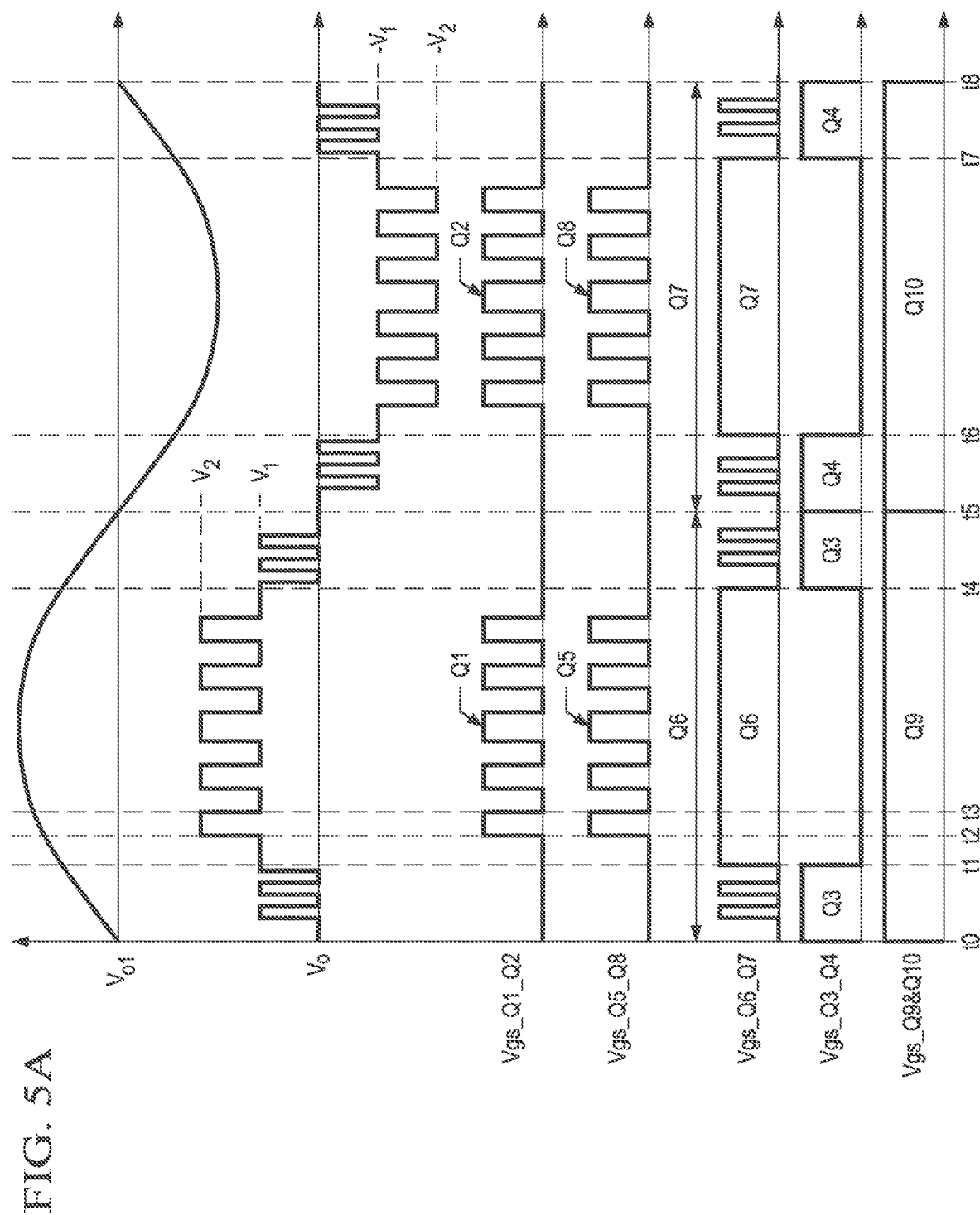
FIG. 5A illustrates a timing diagram of various signals in the five-level inverter shown in FIG. 4A.

FIG. 5A illustrates a timing diagram of various signals in the five-level inverter shown in FIG. 4A. $V_{O1}$ is the voltage waveform at the output of the L-C filter shown in FIG. 4A. As shown in FIG. 5A, the L-C filter helps to filter the five-level PWM voltage $V_O$ to obtain a sinusoidal waveform. During the time interval from t0 to t1, switch Q5 is turned off. By switching on and off either switch Q3 or switch Q6, a PWM waveform can be generated at V0. The freewheeling conduction channel formed by switch Q9 and switch Q10 provides a current path between $V_O$ and the dc input ground. It should be noted the Q9 and Q10 are turned on during the first half cycle and the second half cycle respectively.

During the time interval from t1 to t4, the five-level inverter 400 (shown in FIG. 4A) switches back and forth between $V_1$ and $V_2$. As shown in FIG. 5A, switch Q6 is turned on during this time interval. Switch Q3 is turned off and the freewheeling diode D3 is forward biased or reverse biased in a pattern complementary to switch Q5. In particular, when switch Q5 is turned on, the output of the five-level inverter 400 is coupled to the output of the boost converter. On the other hand, when switch Q5 is off, the forward biased freewheeling diode D3 provides a freewheeling path between the output and the input dc source.

It should be noted that instead of using freewheeling diode D3, during the time interval from t1 to 54, switch Q3 can providing a freewheeling channel by emulating diode operation. It should further be noted that while FIG. 5A shows switch Q1 of the boost dc/dc converter 402 is turned on and off in a pattern similar to that of switch Q5, the operation of switch Q1 is independent from other switches. One skilled in the art will recognize that the timing diagram of the switch Q1 shown in FIG. 5A is merely an example. In fact, a controller (not shown) may turn on and off switch Q1 based upon the operation principles of boost dc/dc converters. It is not necessary for switch Q1 to operate in phase with switch Q5.

Figure 5B:
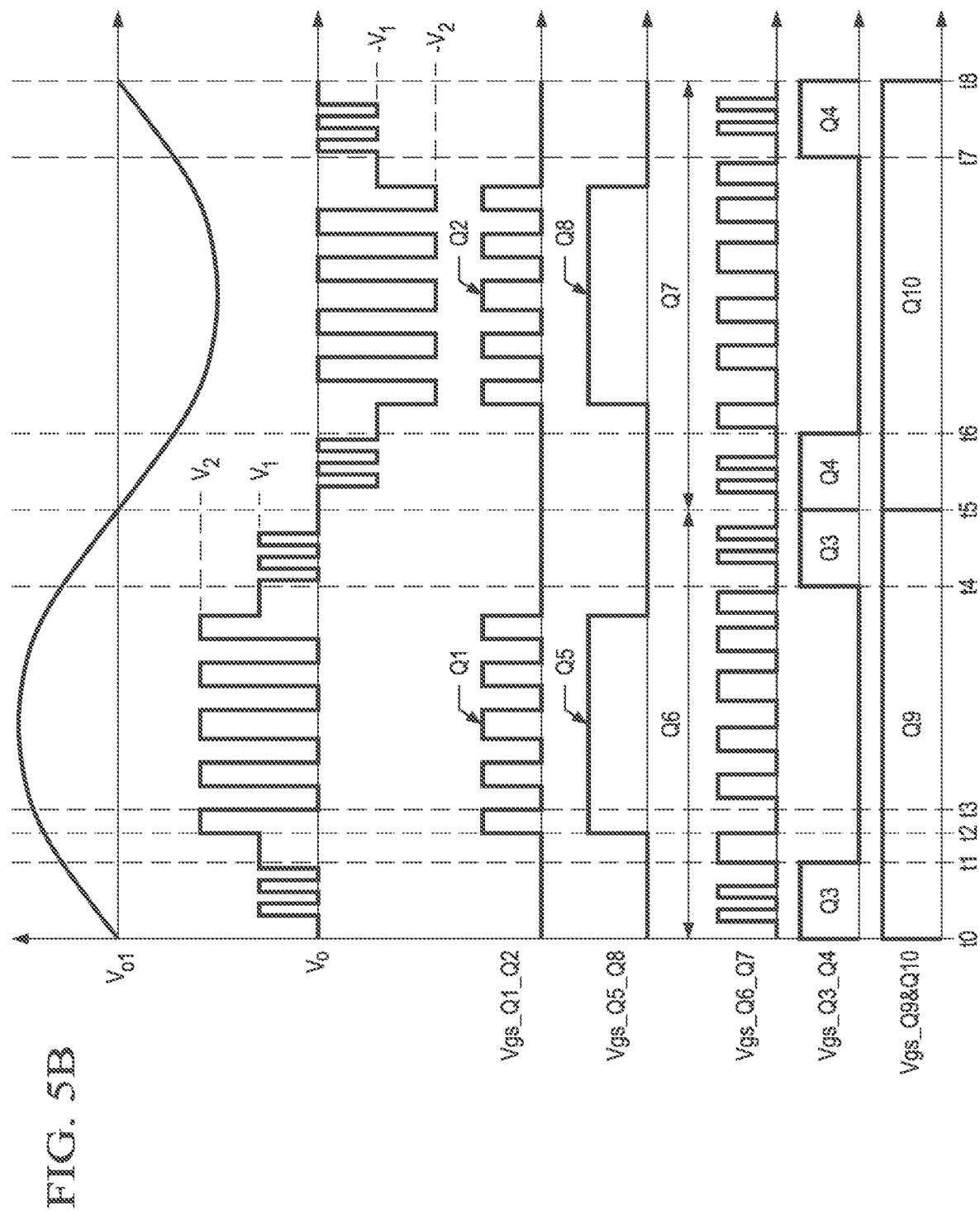
FIG. 5B illustrates another timing diagram of various signals in the five-level inverter shown in FIG. 4A

FIG. 5B illustrates another timing diagram of various signals in the five-level inverter shown in FIG. 4A. The timing diagram of FIG. 5B is similar to that of FIG. 5A except that the gate drive signals of Q5 and Q8 are different from their corresponding signals shown in FIG. 5A. One person skilled in the art will recognize that the switching patterns shown in FIG. 5B may help to reduce the switching losses.

Figure 6A:
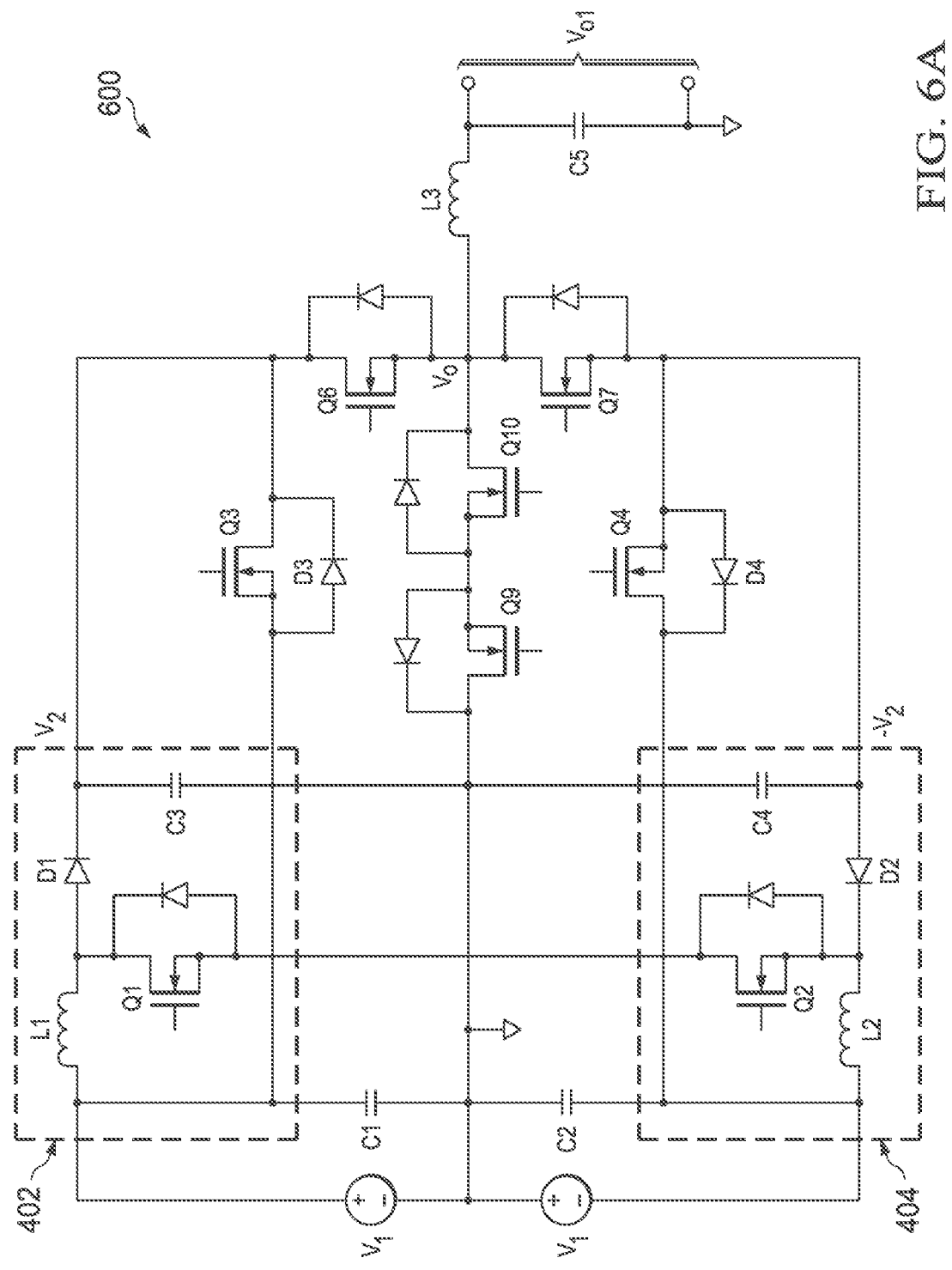
FIG. 6A illustrates a schematic diagram of the five-level inverter system shown in FIG. 3 in accordance with an embodiment.

FIG. 6A illustrates a schematic diagram of the five-level inverter system shown in FIG. 3 in accordance with an embodiment. The five-level inverter 600 is similar to the five-level inverter 400 shown in FIG. 4A except that the switches Q5 and Q8 (shown in FIG. 4A) are removed so that the conduction losses of switches Q5 and Q8 can be further saved. A trade-off of removing switches Q5 and Q8 is that the boost dc/dc converter (e.g., the first boost dc/dc converter 402) must stop switching when the five-level inverter 600 switches back and forth between 0V and $V_1$. In addition, during the transition from a boost mode (e.g., switching between $V_1$ and $V_2$) to an input dc source mode (e.g., switching between 0V to $V_1$), the switch Q3 will not be turned on until the output capacitor C3 is discharged to a level approximately equal to $V_1$. Furthermore, during the boost mode (e.g., switching between $V_1$ and $V_2$), the freewheeling path is not between $V_O$ and $V_1$. Instead, the freewheeling path is between $V_O$ and the input dc ground.

Figure 6B:
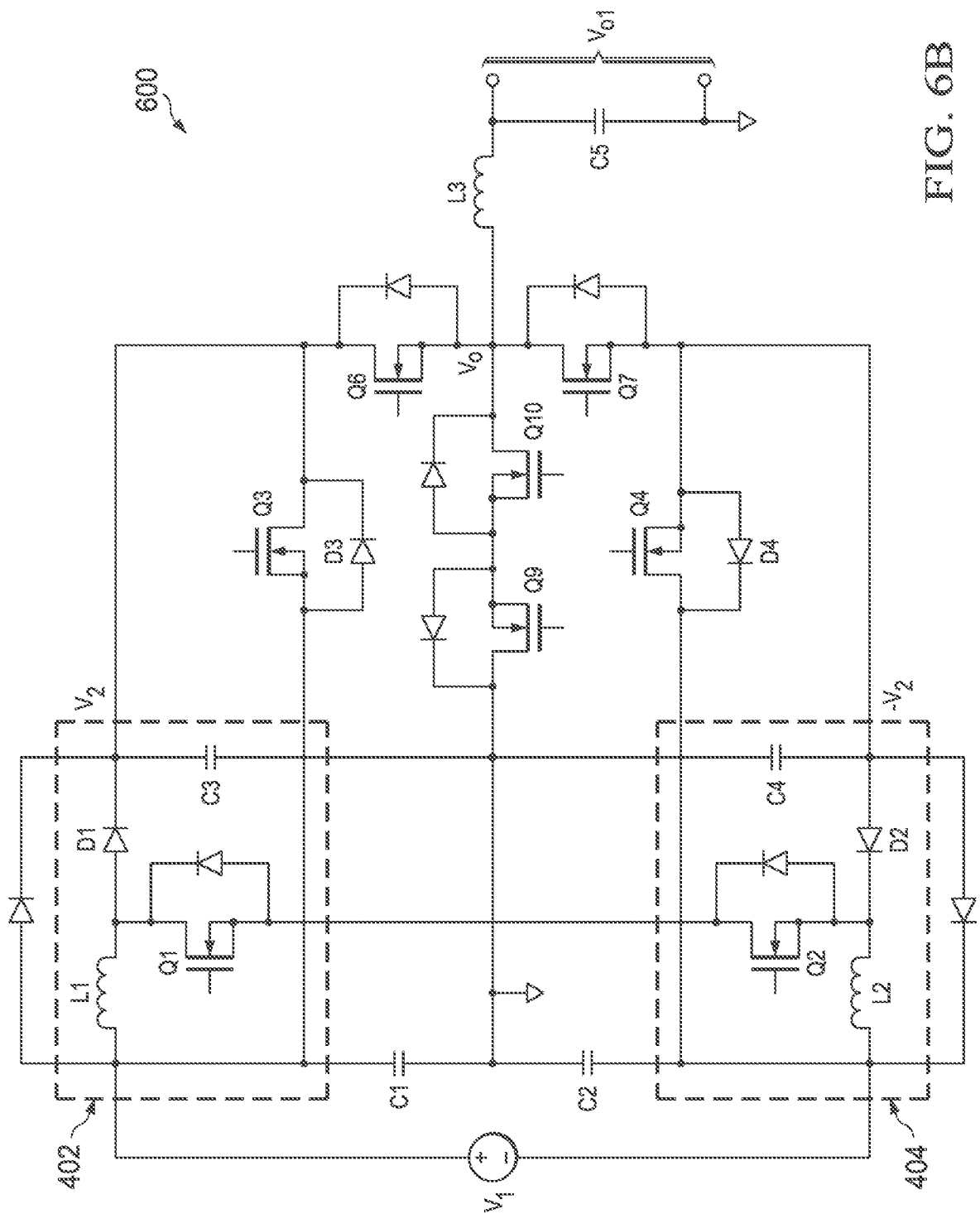
FIG. 6B illustrates a schematic diagram of the five-level inverter system shown in FIG. 3 in accordance with another embodiment.

FIG. 6B illustrates a schematic diagram of the five-level inverter system shown in FIG. 3 in accordance with another embodiment. The schematic diagram of FIG. 6B is similar to the schematic diagram of FIG. 6A except that a single input power source is employed to provide power for the multilevel inverter system. In addition, two bypass diodes are employed to facilitate the operation of the five-level inverter system when the boost converters do not work. The detailed description of the multilevel inverter system has been discussed above with respect to FIG. 6A, and hence is not discussed herein to avoid unnecessary repetition.

Figure 7:
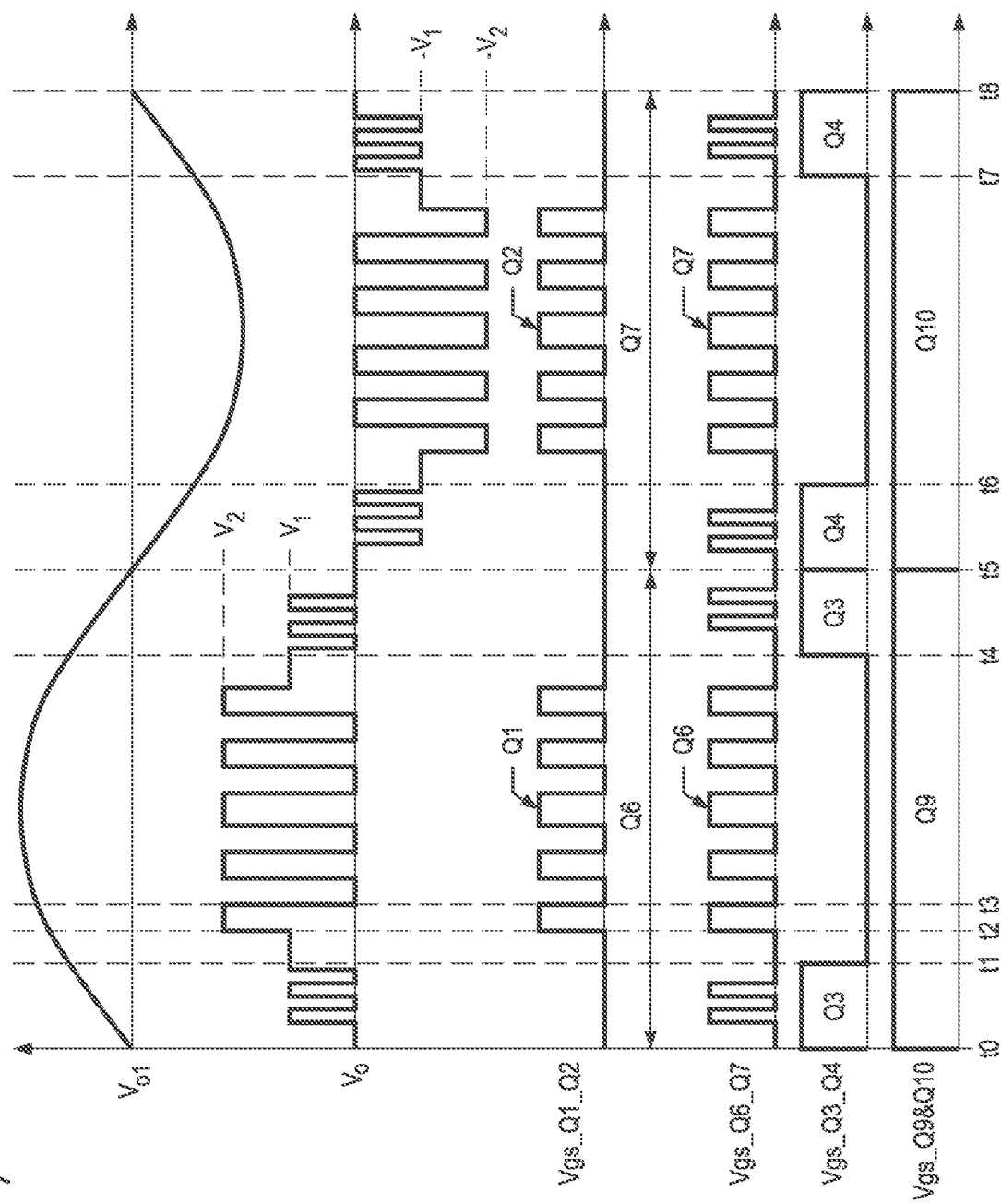
FIG. 7 illustrates a timing diagram of various signals in the five-level inverter shown in FIG. 5A.

FIG. 7 illustrates a timing diagram of various signals in the five-level inverter shown in FIG. 6A. FIG. 7 is quite similar to FIG. 5A except that during the boost mode (e.g., switching between $V_1$ and $V_2$), the freewheeling path is provided by switches Q9 and Q10 (shown in FIG. 6A). In addition, the switch Q3 is off during the boost mode (time interval from t1 to t4). An advantageous feature of having the system configuration shown in FIG. 7 is the conduction losses as well as the efficiency of the five-level inverter 600 can be improved by reducing the total number of switches in the five-level inverter 600.

Figure 8:
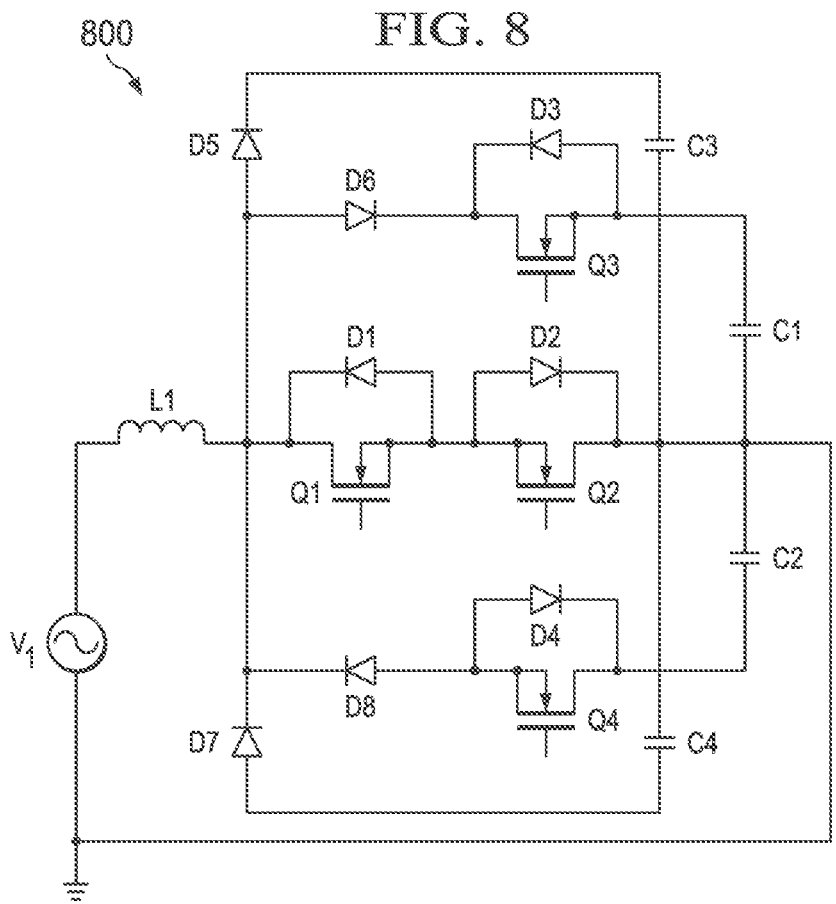
FIG. 8 illustrates a schematic diagram of a five-level rectifier in accordance with an embodiment.

FIG. 8 illustrates a schematic diagram of a five-level rectifier in accordance with an embodiment. The five-level rectifier 800 is similar to the Vienna rectifier except that it is a five-level topology rather than a three level topology employed by the Vienna rectifier. The Vienna rectifier is well known in the art, and hence is not discussed in further detail herein. The five-level rectifier 800 shown in FIG. 8 includes two boost converters and two buck converter. The first boost converter is formed by the inductor L1, diode D5 and an isolation switch formed by Q1 and Q2 connected in series. During the first half cycle, the first boost converter generates a high bus voltage across the capacitor C3. The first buck converter is formed by diode D6 and switch Q3. The first buck converter generates a low bus voltage across the capacitor C1. Likewise, during a second half cycle, the second boost converter and the second buck converter generate two voltage potentials across capacitor C4 and capacitor C2 respectively.

For simplicity, only the first half cycle's operation is described below to illustrate the operation of the five-level rectifier 800. During a boost mode, the isolated switch formed by switches Q1 and Q2 is turned on. As a result, the energy from the input source $V_1$ is stored in the input inductor L1. After the isolation switch is turned off. The input inductor L1 is discharged through two separate paths. Through a first path formed by diode D5 and C3, the inductor L1 charges the capacitor C3 to a higher voltage. Likewise, through a second path formed by D6, Q3 and C1, the inductor L1 charges the capacitor C1 and achieves a regulated and adjustable voltage across the capacitor C1 by adjusting the conduction time of the switch Q3. It should be noted that the second discharge path is common referred to as a buck mode of the five-level rectifier 800. It should further be noted that the buck mode operation occurs when the input inductor L1 operates in a discharge mode.

In accordance with an embodiment, the voltage across the capacitor C2 is greater than the voltage across the capacitor C1. As such, there may be two voltage levels generated by the five-level rectifier 800 during the first half cycle. Likewise, during the second half cycle, the input ac source $V_1$ generates voltages across the capacitors C2 and C4 respectively. As such, the output of the five-level rectifier 800 may generate four independent voltage sources. One advantageous feature of having a five-level rectifier is that the voltage stresses of the five-level rectifier are reduced and the THD of the five-level rectifier is lower compared to a three-level rectifier. As a result, the five-level rectifier can achieve an efficient ac/dc conversion.

Figure 9:
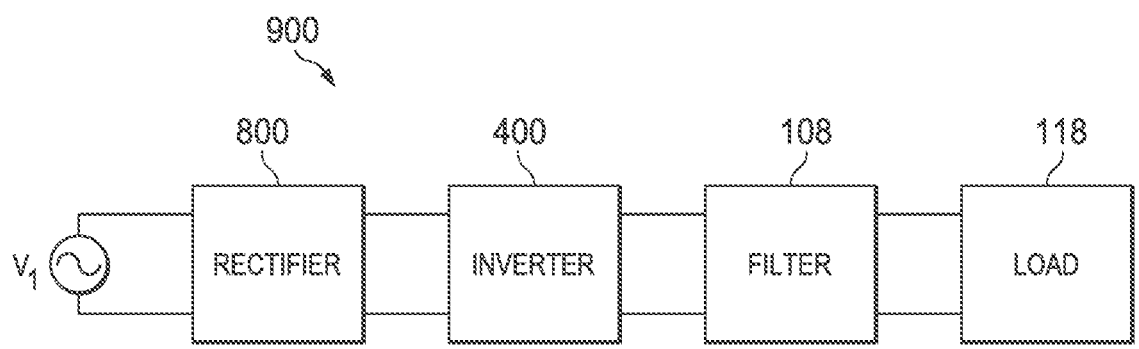
FIG. 9 illustrates a block diagram of an uninterruptible power supply (UPS) system in accordance with an embodiment.

FIG. 9 illustrates a block diagram of an uninterruptible power supply (UPS) system in accordance with an embodiment. A high efficient UPS system 900 may be formed by connecting a five-level rectifier 800 and a five-level inverter 400 in cascade. The five-level rectifier 800 first converts the input ac source into four intermediate dc voltages. The intermediate dc voltages are further converted into an ac voltage by the five-level inverter 400 and the output filter 108. The detailed operation of the UPS system 900 will be discussed below with respect to FIG. 10. One advantageous feature of the UPS system 900 is that the UPS system 900 incorporates the advantages of the five-level rectifier 800 and the five-level inverter 400. As a result, the UPS system 900 can deliver a high performance ac output with a relatively small solation size.

Figure 10:
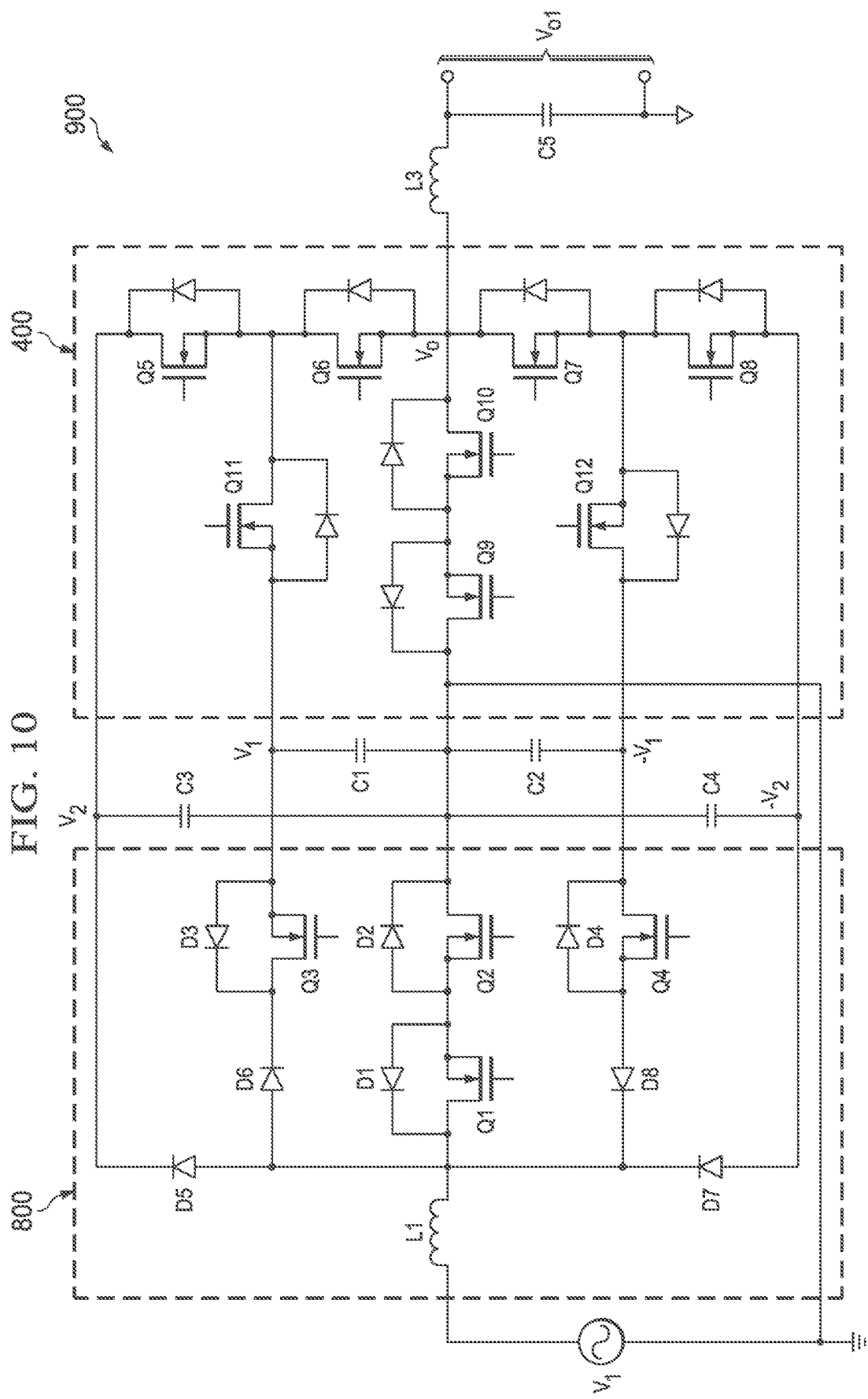
FIG. 10 illustrates a schematic diagram of the UPS system shown in FIG. 9 in accordance with an embodiment.

FIG. 10 illustrates a schematic diagram of the UPS system shown in FIG. 9 in accordance with an embodiment. A high efficient UPS system 900 may comprise a five-level rectifier 800 and a five-level inverter 400 connected in cascade. As shown in FIG. 10, the five-level rectifier 800 first converts the input ac source into four different voltages, namely $V_2$, $V_1$, $-V_1$ and $-V_2$. The five-level inverter 400 is able to generate a staircase waveform by connecting the output $V_O$ with different voltages (e.g., $V_2$) through different combinations of the switches Q5, Q6, Q7, Q8, Q11 and Q12. It should be noted that both the five-level rectifier 800 shown in FIG. 8 and the five-level inverter 400 shown in FIG. 4A require two boost stages to generate a higher voltage (e.g., $V_2$ and $-V_2$). As shown in FIG. 10, when the five-level rectifier 800 and the five-level inverter 400 are connected in cascade, the four boost stages required by the five-level rectifier 800 and the five-level inverter 400 can be merged into two boost stages located in the five-level rectifier 800. As a result, the UPS system 900 can achieve a relatively small solation size.

Figure 11A:
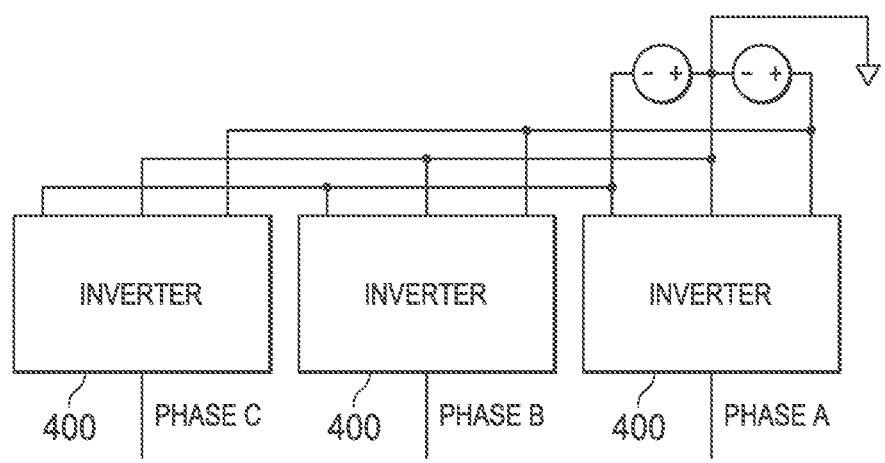
FIG. 11A illustrates a block diagram of a three-phase multilevel inverter in accordance with an embodiment.

FIG. 11A illustrates a block diagram of a three-phase multilevel inverter. Each phase of the three-phase multilevel inverter may employ an n-level inverter (e.g., a five-level inverter 400 shown in FIG. 4). As shown in FIG. 11A, each phase of the three-phase inverter shares a common positive dc input, a common negative dc input and ground. Additional voltage levels may be generated by using additional boost apparatuses, which convert dc inputs into higher voltage levels. As such, the three-phase inverter shown in FIG. 11A may have an n-level (e.g., five-level) output phase voltage. In addition, the three-phase inverter may have a (2n−1)-level (e.g., nine-level) output line-to-line voltage.

Figure 11B:
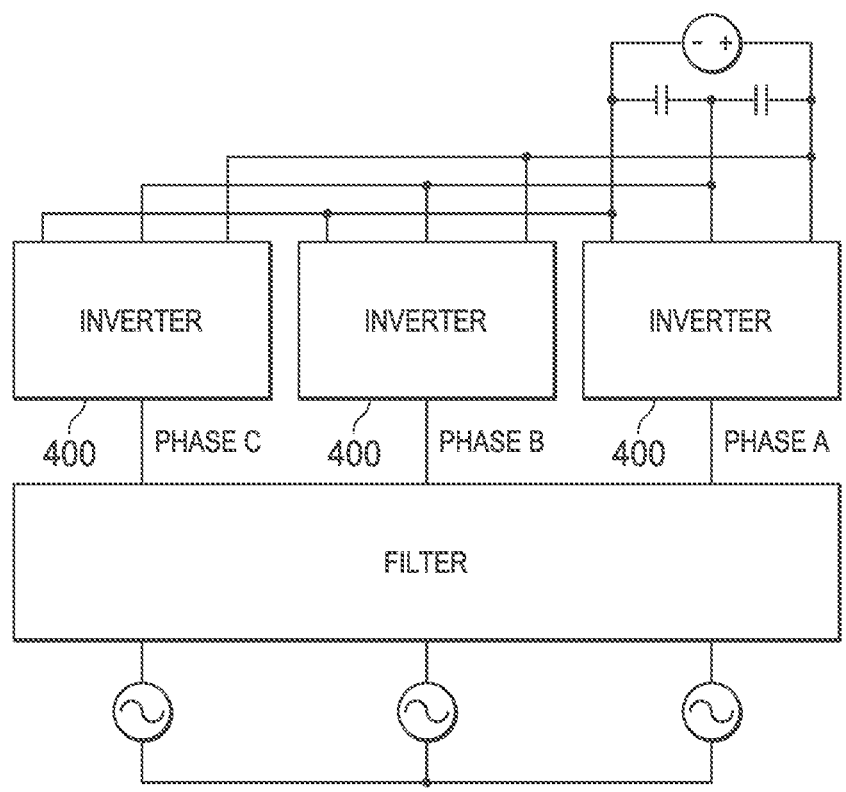
FIG. 11B illustrates a block diagram of a three-phase multilevel inverter having an output filter in accordance with an embodiment.

FIG. 11B illustrates a block diagram of a three-phase multilevel inverter having an output filter in accordance with an embodiment. In FIG. 11B, the three-phase multilevel inverter is coupled to a power grid through a filter. The three-phase multilevel inverter of FIG. 11B is similar to the three-phase multilevel inverter shown in FIG. 11A except that the input power source is a single power source. The detailed structure and operation of the three-phase multilevel inverter has been described above with respect to FIG. 11A, and hence is not discussed herein to avoid repetition.

Figure 11C:
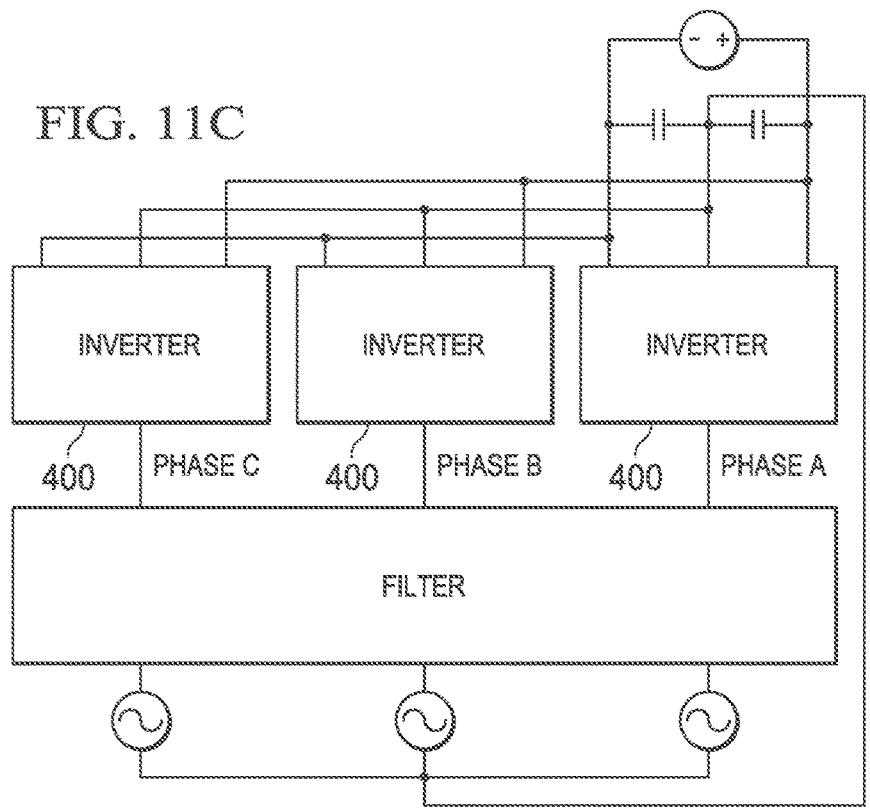
FIG. 11C illustrates a block diagram of a three-phase multilevel inverter having an output filter in accordance with another embodiment.

FIG. 11C illustrates a block diagram of a three-phase multilevel inverter having an output filter in accordance with another embodiment. The three-phase multilevel inverter of FIG. 11C is similar to the three-phase multilevel inverter shown in FIG. 11B except that the neutral point of the power grid is connected to the junction point of two input capacitors. The detailed structure and operation of the three-phase multilevel inverter has been described above with respect to FIG. 11A, and hence is not discussed herein to avoid repetition.

Figure 11D:
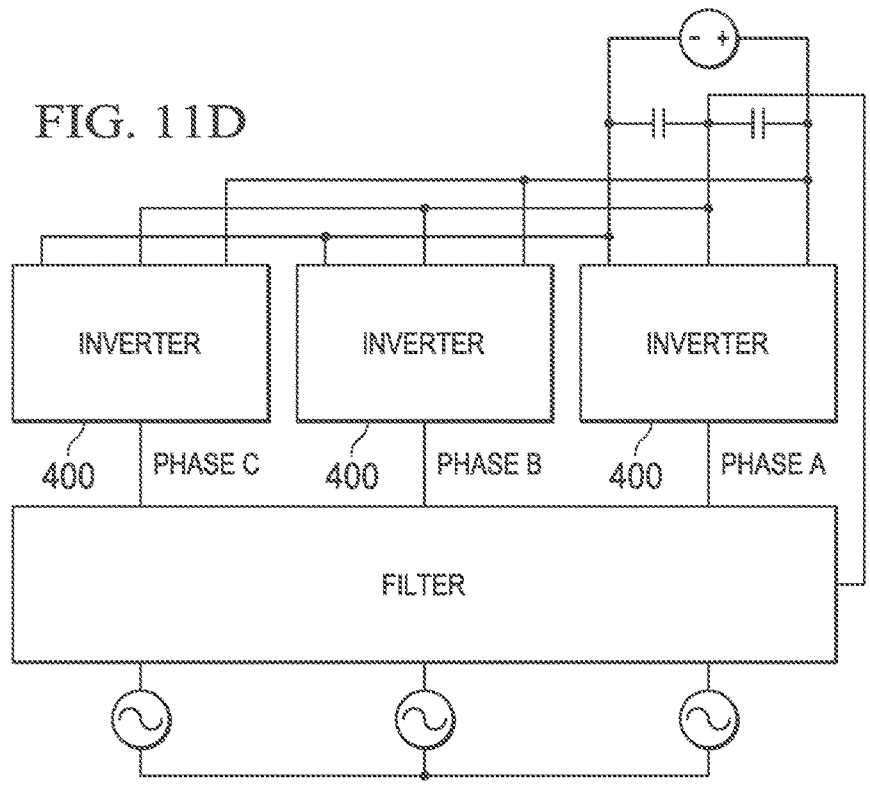
FIG. 11D illustrates a block diagram of a three-phase multilevel inverter having an output filter in accordance with another embodiment.

FIG. 11D illustrates a block diagram of a three-phase multilevel inverter having an output filter in accordance with another embodiment. The three-phase multilevel inverter of FIG. 11D is similar to the three-phase multilevel inverter shown in FIG. 11B except that the neutral point of the output filter is connected to the junction point of two input capacitors. The detailed structure and operation of the three-phase multilevel inverter has been described above with respect to FIG. 11A, and hence is not discussed herein to avoid repetition.

Figure 11E:
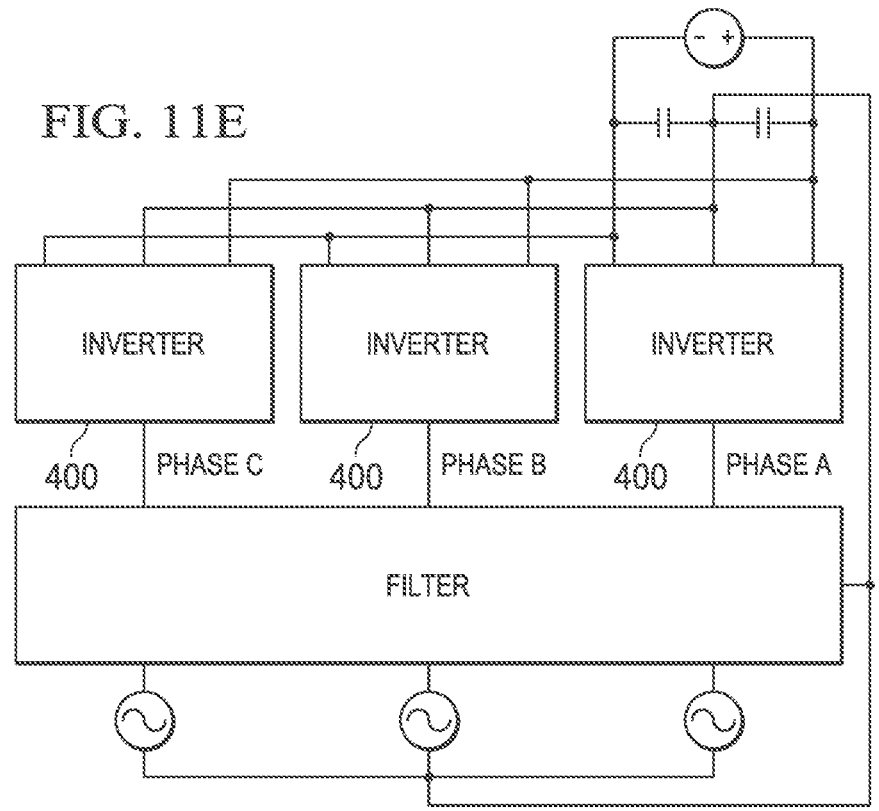
FIG. 11E illustrates a block diagram of a three-phase multilevel inverter having an output filter in accordance with another embodiment.

FIG. 11E illustrates a block diagram of a three-phase multilevel inverter having an output filter in accordance with another embodiment. The three-phase multilevel inverter of FIG. 11E is similar to the three-phase multilevel inverter shown in FIG. 11B except that both the neutral point of the output filter and the neutral point of the power grid are connected to the junction point of two input capacitors. The detailed structure and operation of the three-phase multilevel inverter has been described above with respect to FIG. 11A, and hence is not discussed herein to avoid repetition.

Figure 11F:
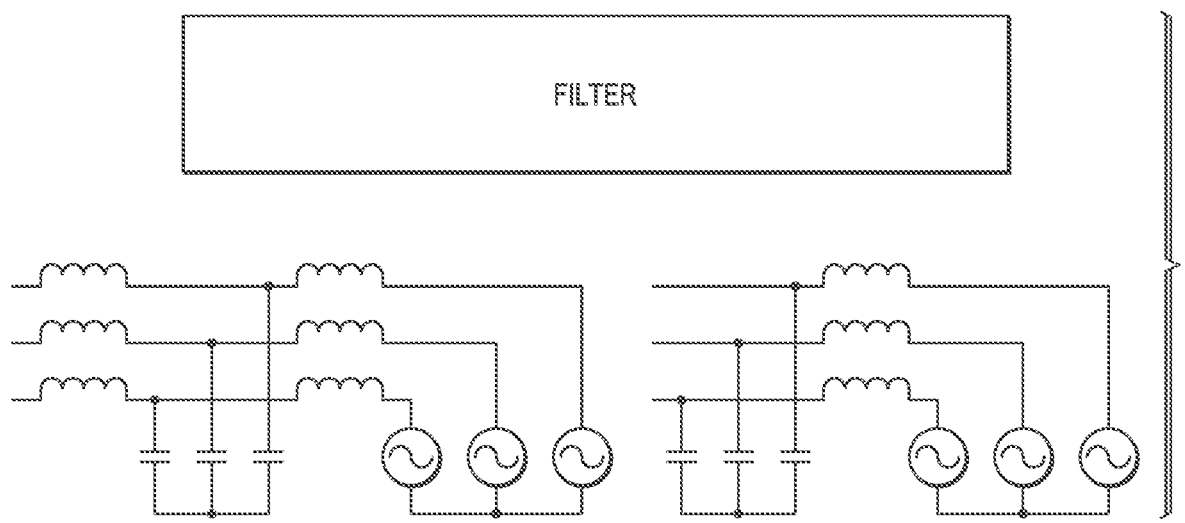
FIG. 11F illustrates a schematic diagram of the output filter shown in FIG. 11B in accordance with an embodiment.

FIG. 11F illustrates a schematic diagram of the output filter shown in FIG. 11B in accordance with an embodiment. As shown in FIG. 11F, the output filter is a three phase output filter. In accordance with an embodiment, the output filter may comprise one group of output inductors. Alternatively, the output filter may comprise a second group of output inductors. More particularly, the second group of output inductors and the first group of output inductors are connected in cascade.

Figure 12:
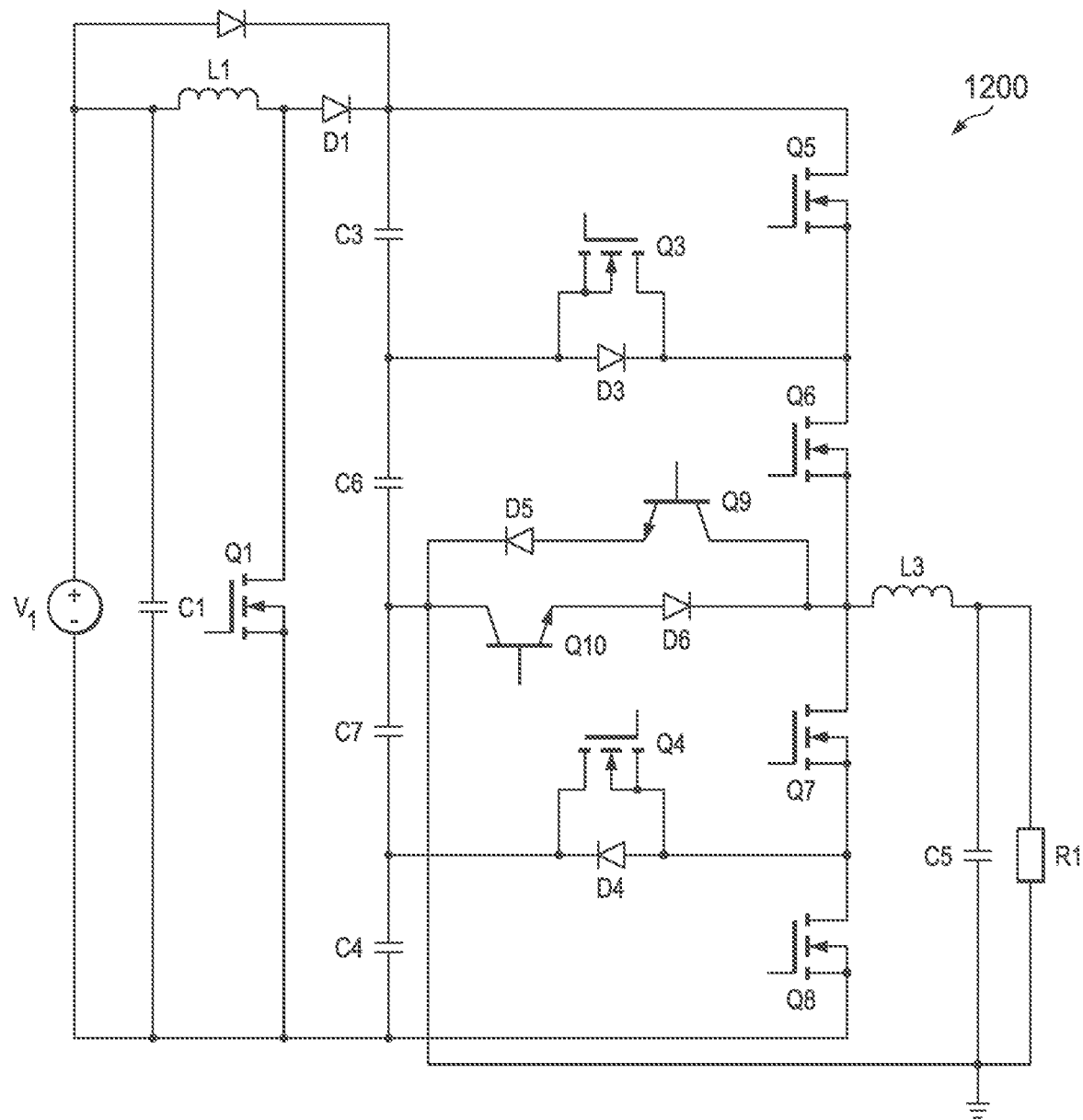
FIG. 12 illustrates a schematic diagram of a five-level inverter in accordance with another embodiment.

FIG. 12 illustrates a schematic diagram of a five-level inverter in accordance with another embodiment. The schematic diagram of the five-level inverter 1200 in FIG. 12 is similar to that of the five-level inverter 400 in FIG. 4A except that a single boost dc/dc converter is employed to generate a five-level input voltage source. As shown in FIG. 12, the single boost converter is formed by an input inductor L1, a low side switch Q1 and a diode D1. The first voltage level is at the positive terminal of the capacitor C3. The second voltage level is at the joint point between the capacitor C3 and the capacitor C6. The third voltage level is at the joint point between the capacitor C6 and the capacitor C7. The fourth voltage level is at the joint point between the capacitor C7 and the capacitor C4. The fifth voltage level is at the negative terminal of the capacitor C4. One person skilled in the art will understand the operation of the five-level inverter 1200 based upon the description with respect to FIG. 4A. Therefore, the detailed operation of the five-level inverter 1200 is not discussed herein. It should be noted that FIG. 12 further comprises a bypass diode, which provides power when the boost converter does not work.

Figure 13:
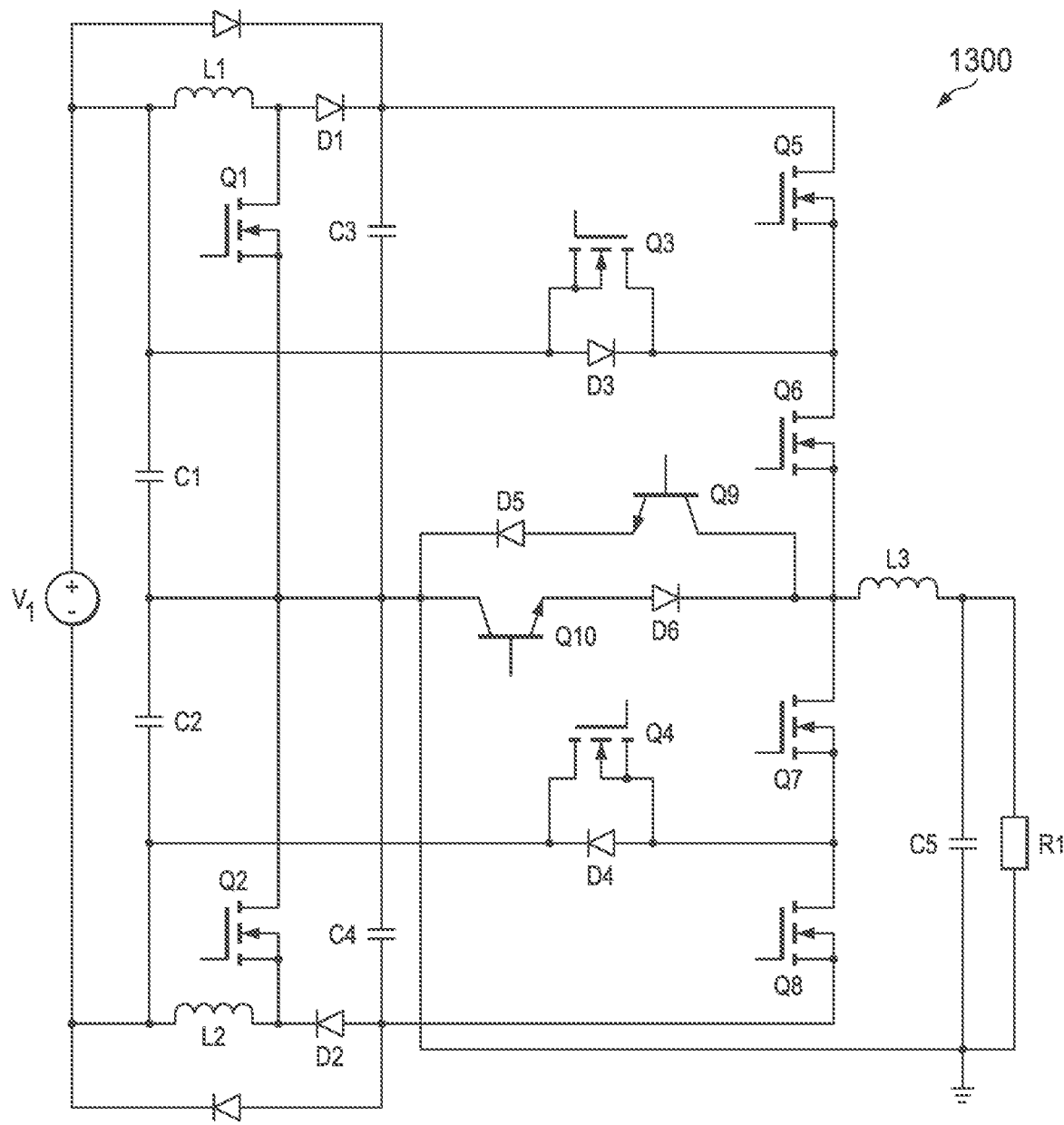
FIG. 13 illustrates a schematic diagram of a five-level inverter in accordance with another embodiment.

FIG. 13 illustrates a schematic diagram of a five-level inverter in accordance with another embodiment. The schematic diagram of the five-level inverter 1300 in FIG. 13 is similar to that of the five-level inverter 400 in FIG. 4A except that a single input dc voltage source $V_1$ is employed to generate a five-level input voltage source. One person skilled in the art will understand the operation of the five-level inverter 1300 based upon the description with respect to FIG. 4A. Therefore, the detailed operation of the five-level inverter 1300 is not discussed herein to avoid unnecessary repetition. It should be noted that FIG. 13 further comprises two bypass diodes, which provides power when the boost converters do not work.

Figure 14:
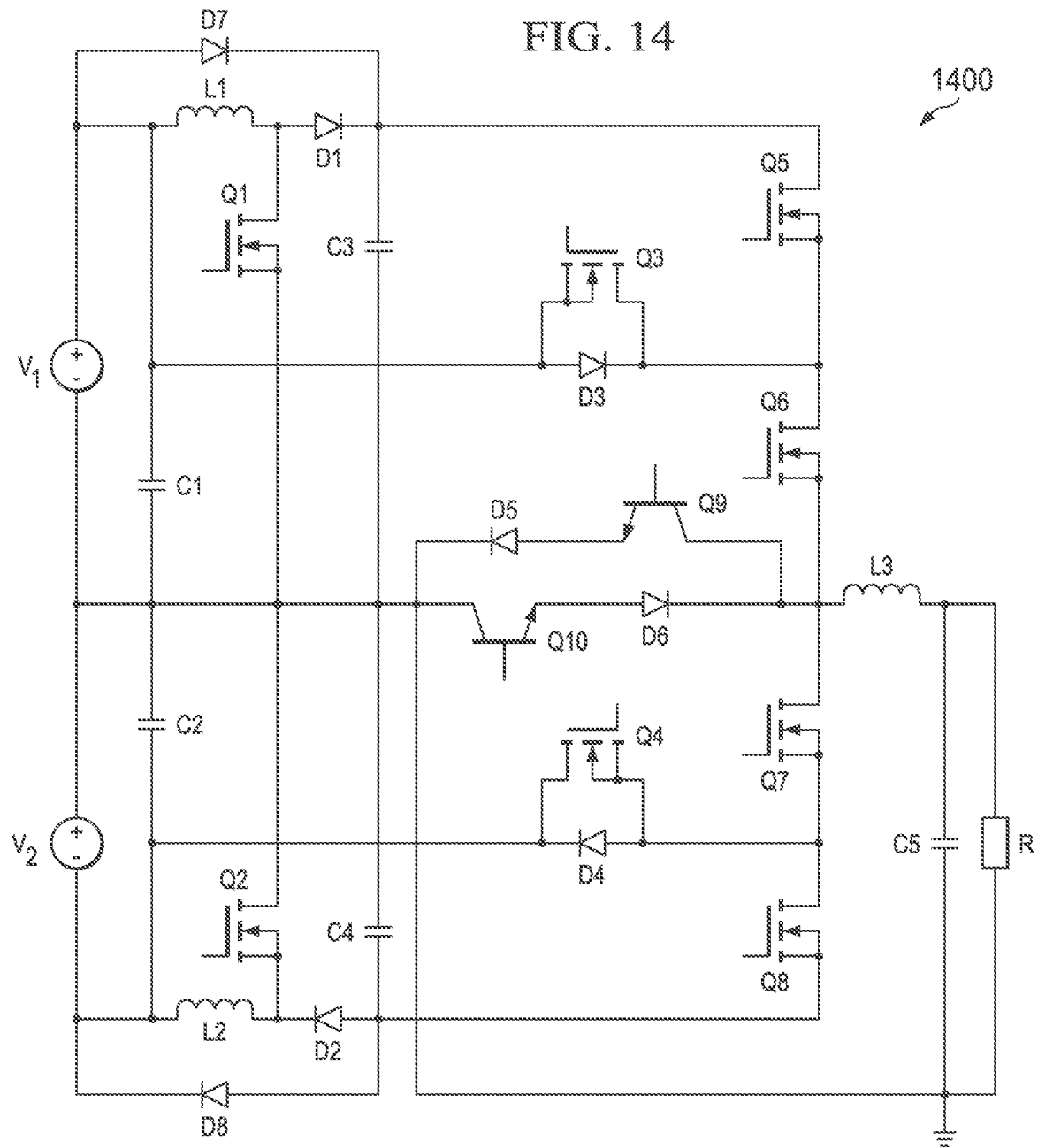
FIG. 14 illustrates a schematic diagram of a five-level inverter in accordance with another embodiment.

FIG. 14 illustrates a schematic diagram of a five-level inverter in accordance with another embodiment. The schematic diagram of the five-level inverter 1400 in FIG. 14 is similar to that of the five-level inverter 400 in FIG. 4 except that two additional diodes D7 and D8 are employed to improve the efficiency of the five-level inverter 1400 when the input dc sources have a high voltage. More particularly, when the input voltage source (e.g., $V_1$) is higher than a predetermined threshold, the input boost dc/dc converter may be turned off. The energy from the input dc source is transferred to the output of the five-level inverter 1400 through switches Q5 and Q6. In addition, the switch Q3 may be configured such that the power flow path formed by D7 and Q5 is connected in parallel with the power flow path formed by Q3. Such a parallel connection helps to reduce the conduction losses.

Figure 15:
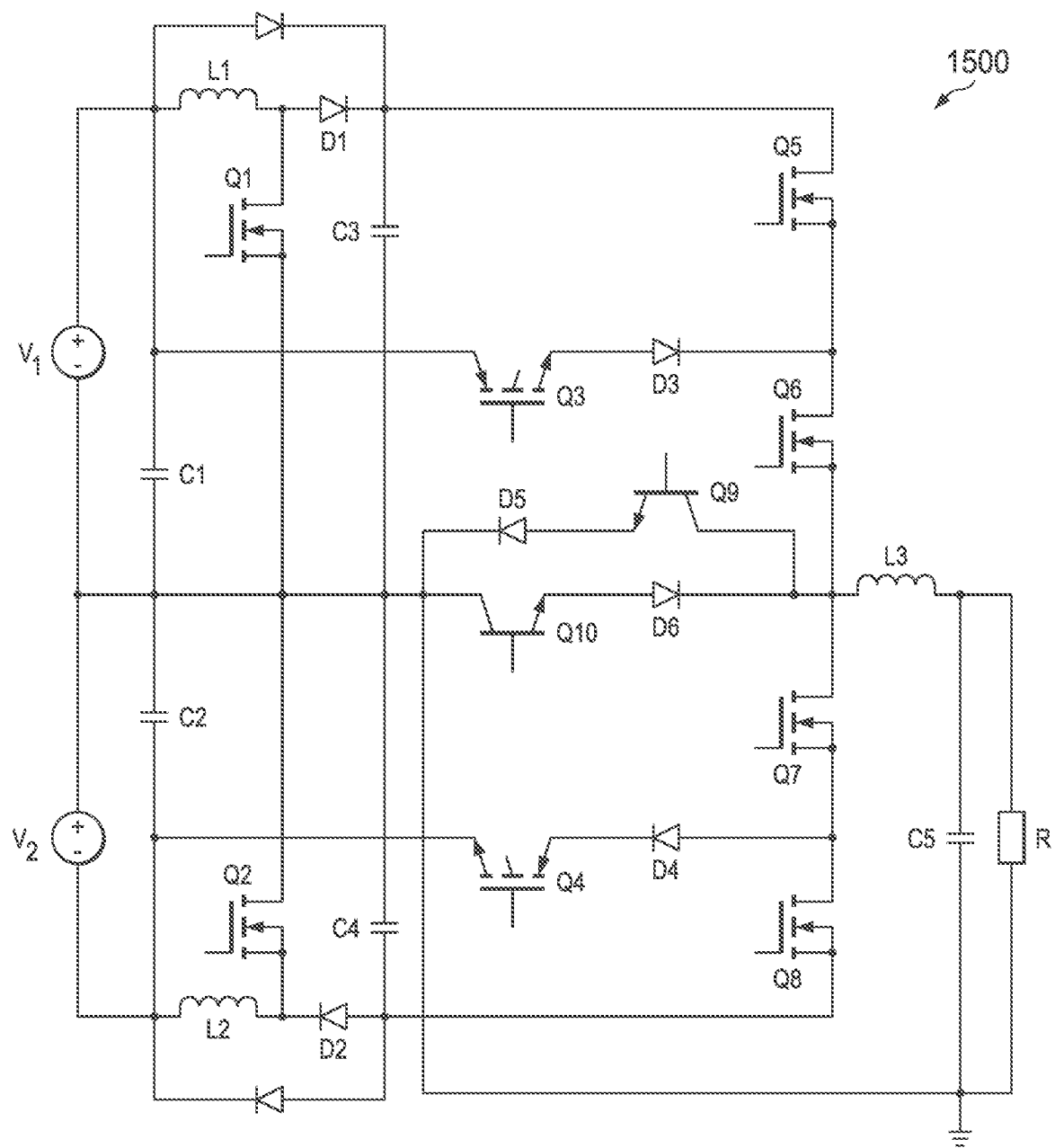
FIG. 15 illustrates a schematic diagram of a five-level inverter in accordance with another embodiment.

FIG. 15 illustrates a schematic diagram of a five-level inverter in accordance with another embodiment. The schematic diagram of the five-level inverter 1500 in FIG. 15 is similar to that of the five-level inverter 400 in FIG. 4A except that an IGBT device is used to replace a MOSFET shown in FIG. 4A. In particular, the combination of an IGBT device and a blocking diode are used to replace a MOSFET (e.g., Q3). One person skilled in the art will recognize that IGBT devices are vulnerable to a negative voltage. The block diode (e.g., D3) in series connection with the IGBT device (e.g., Q3) helps to prevent a negative voltage from damaging the IGBT device. It should be noted that FIG. 15 further comprises two bypass diodes, which provides power when the boost converters do not work.

Figure 16:
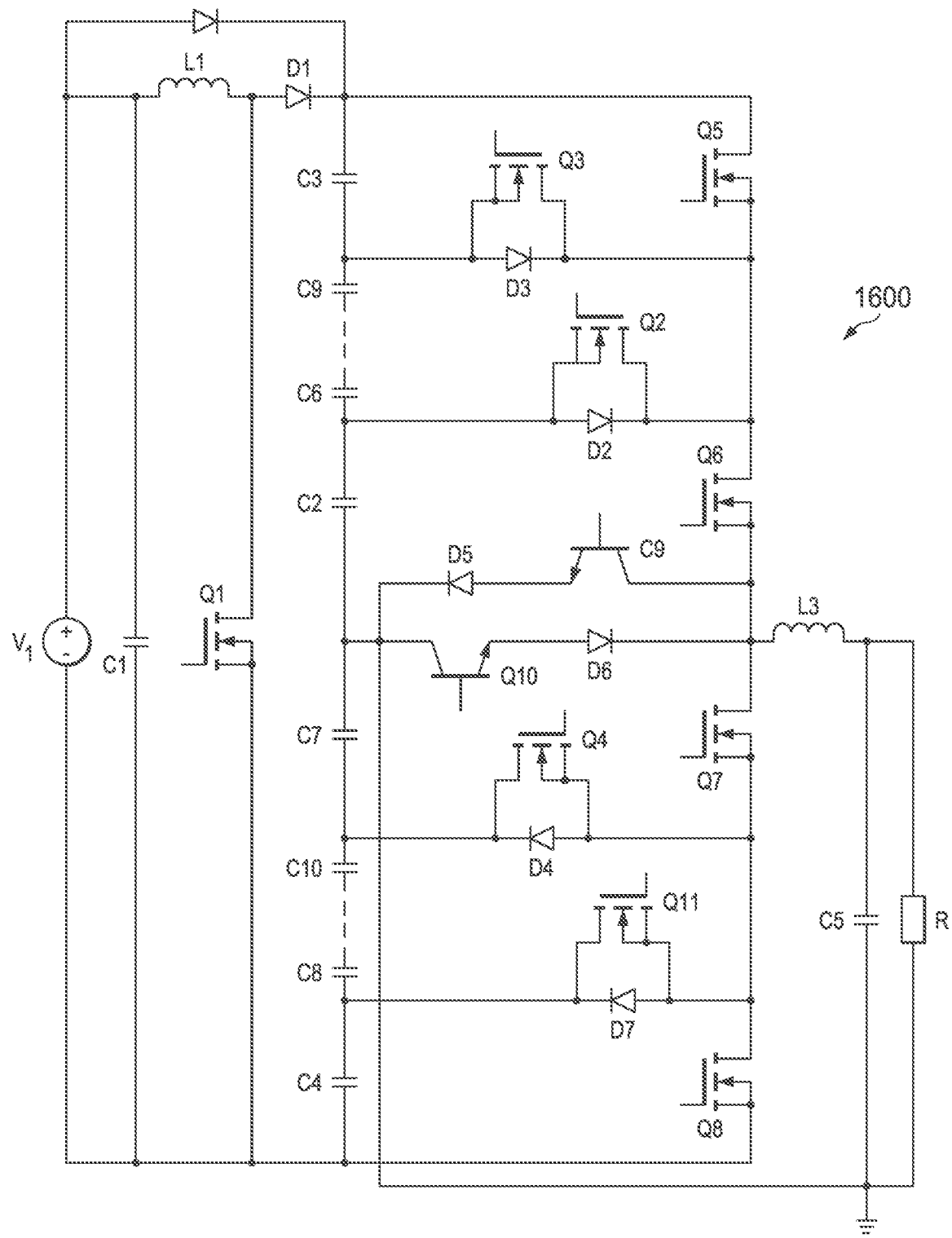
FIG. 16 illustrates a schematic diagram of an N-level inverter in accordance with an embodiment.

FIG. 16 illustrates a schematic diagram of an N-level inverter in accordance with an embodiment. The schematic diagram of the N-level inverter 1600 in FIG. 16 is similar to that of the five-level inverter 1200 in FIG. 12 except that a single input dc voltage source $V_1$ is employed to generate an N-level input voltage source. The operation of the N-level inverter 1600 is similar to the five-level inverter 1200, and hence is not discussed in further detail herein to avoid unnecessary repetition. It should be noted that FIG. 16 further comprises a bypass diode, which provides power when the boost converter does not work.

Figure 17:
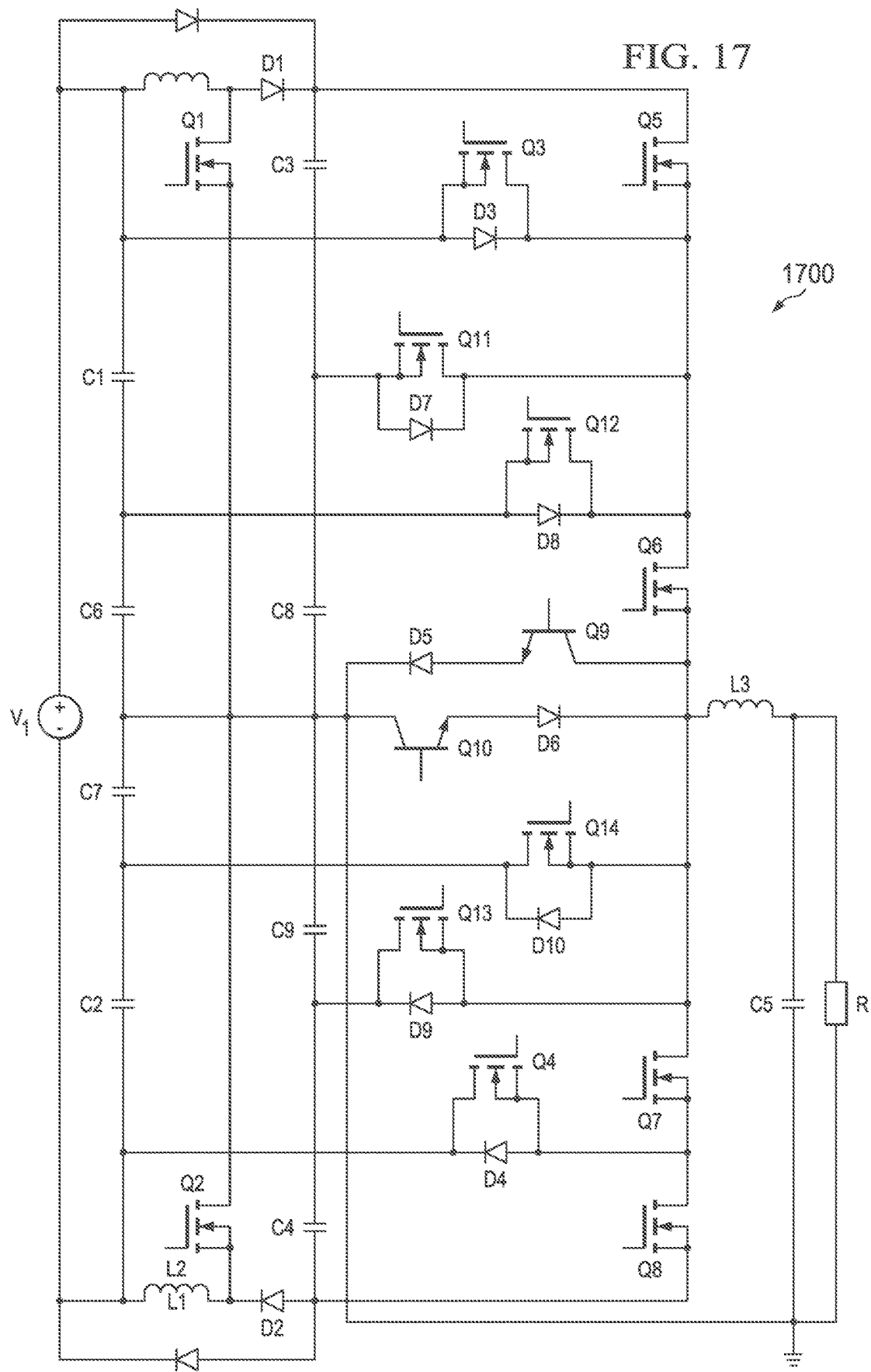
FIG. 17 illustrates a schematic diagram of a nine-level inverter in accordance with an embodiment.

FIG. 17 illustrates a schematic diagram of a nine-level inverter in accordance with an embodiment. The schematic diagram of the nine-level inverter 1700 in FIG. 17 is similar to that of the five-level inverter 1300 in FIG. 13 except that additional capacitors are employed to generate a nine-level input voltage source. The operation of the nine-level inverter 1700 is similar to the five-level inverter 1700, and hence is not discussed in further detail herein to avoid unnecessary repetition. It should be noted that while FIG. 17 illustrates a nine-level inverter, the inverter shown in FIG. 17 can be extended to an N-level inverter by adding additional capacitors. It should be noted that FIG. 17 further comprises two bypass diodes, which provides power when the boost converters do not work.

Figure 18:
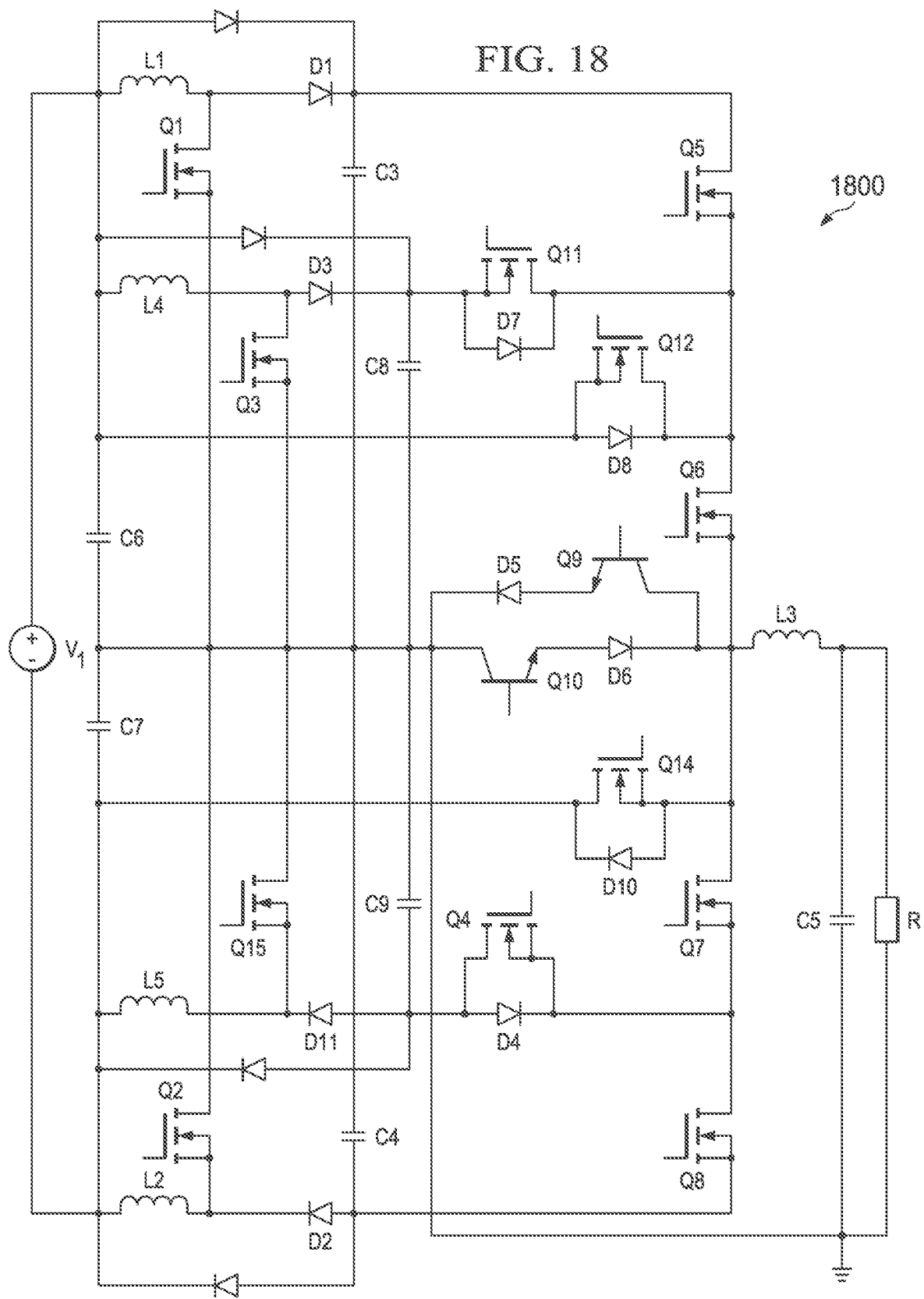
FIG. 18 illustrates a schematic diagram of a seven-level inverter in accordance with an embodiment.

FIG. 18 illustrates a schematic diagram of a seven-level inverter in accordance with an embodiment. The schematic diagram of the seven-level inverter 1800 in FIG. 18 is similar to that of the five-level inverter 1300 in FIG. 13 except that additional boost converters are employed to generate a seven-level input voltage source. More particularly, two more boost converters are employed to generate a seven-level input voltage source. It should be noted that while FIG. 18 illustrates a seven-level inverter, the inverter shown in FIG. 18 can be extended to an N-level inverter by adding additional boost converters. It should be noted that FIG. 18 further comprises four bypass diodes, which provides power when the boost converters do not work.

Figure 19:
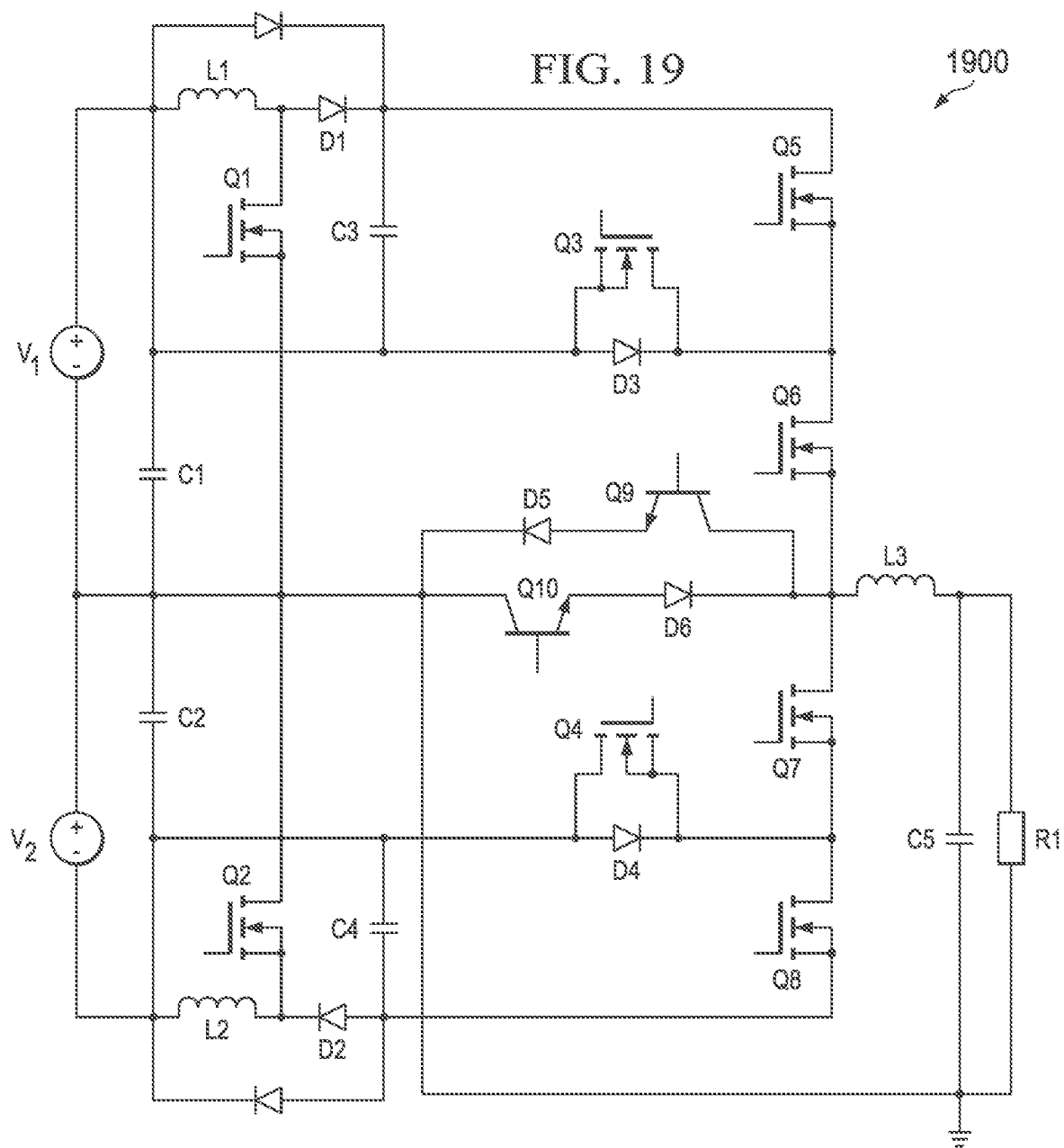
FIG. 19 illustrates a schematic diagram of a five-level inverter in accordance with another embodiment.

FIG. 19 illustrates a schematic diagram of a five-level inverter in accordance with another embodiment. The schematic diagram of the five-level inverter 1900 in FIG. 19 is similar to that of the five-level inverter 400 in FIG. 4A except that the connection of input capacitors (e.g., C1, C2, C3 and C4) has been modified. As shown in FIG. 19, the capacitor C1 and the capacitor C3 are connected in series. Likewise, the capacitor C2 and the capacitor C4 are connected in series. It should be noted that FIG. 19 further comprises two bypass diodes, which provides power when the boost converters do not work.

Figure 20A:
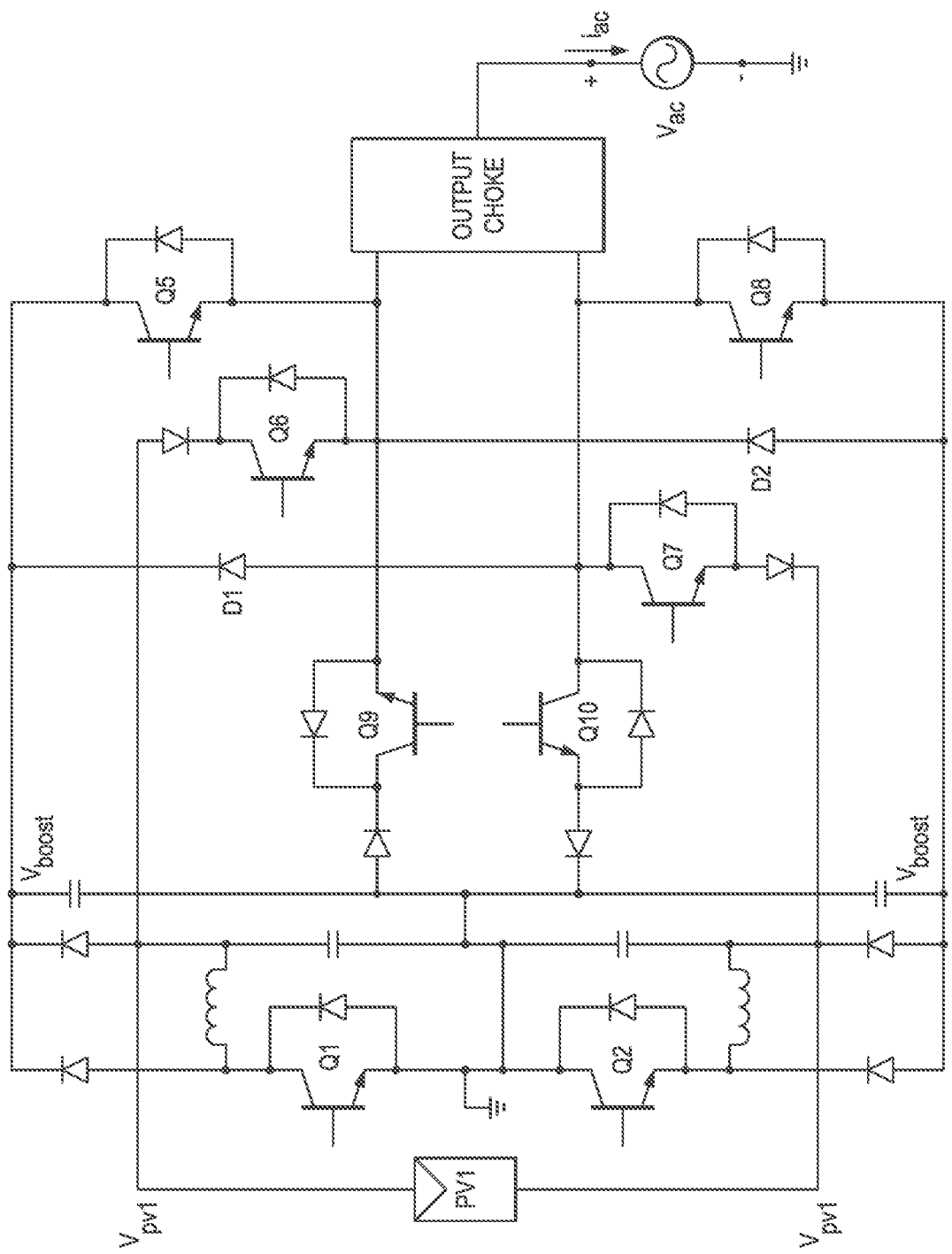
FIG. 20A illustrates a schematic diagram of a multilevel inverter in accordance with an embodiment.

FIG. 20A illustrates a schematic diagram of a multilevel inverter in accordance with an embodiment. The operation of the multilevel inverter of FIG. 20A is similar to the operation of the multilevel inverter of FIG. 4B during an active power process, and hence is not discussed in further detail.

FIG. 20B illustrates a timing diagram of the multilevel inverter shown in FIG. 20A when the multilevel inverter operates in a reactive power process. Referring back to FIG. 20A, in a reactive power process, Q9 and Q10 become the main switches of the multilevel inverter. Q10's operation is described below for explaining the operation of the multilevel inverter. When Q10 is turned on, the power flows from Vac to the output choke, and then to ground through Q10. On the other hand, during the freewheeling period of Q10, when Q10 is turned off, the power flows from Vac to the output choke, and then to ground through D1 and the upper capacitor. Q9's operation is similar to Q10's operation, and hence is not discussed herein to avoid repetition.

Figure 21:
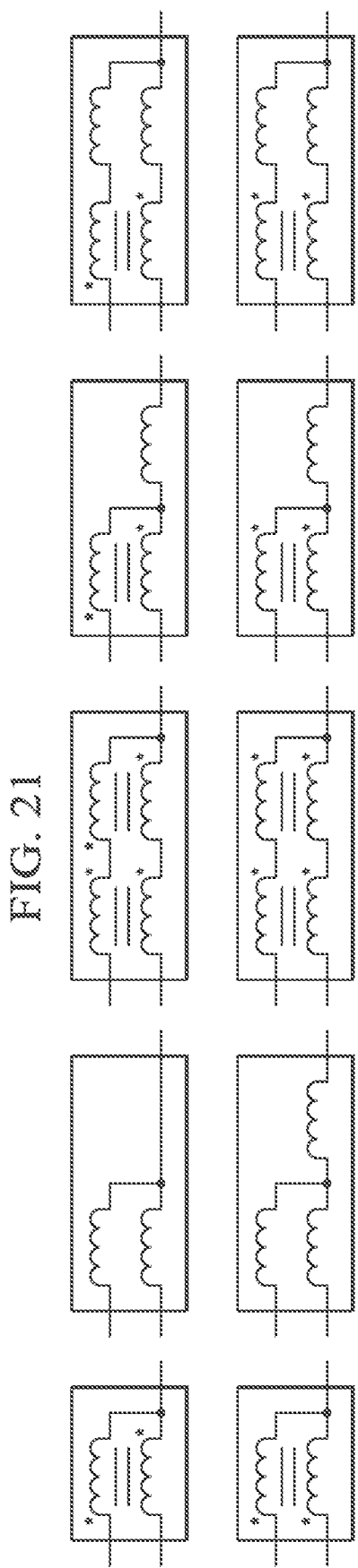
FIG. 21 illustrates a plurality of output choke implementations.

FIG. 21 illustrates a plurality of output choke implementations. As shown in FIG. 21, the output choke can be implemented by a coupled inductor. Alternatively, the output choke can be implemented by multiple inductors connected in series. The choke implementations shown in FIG. 21 are known in the art, and hence are not discussed in further detail herein to avoid repetition.

Figure 22:
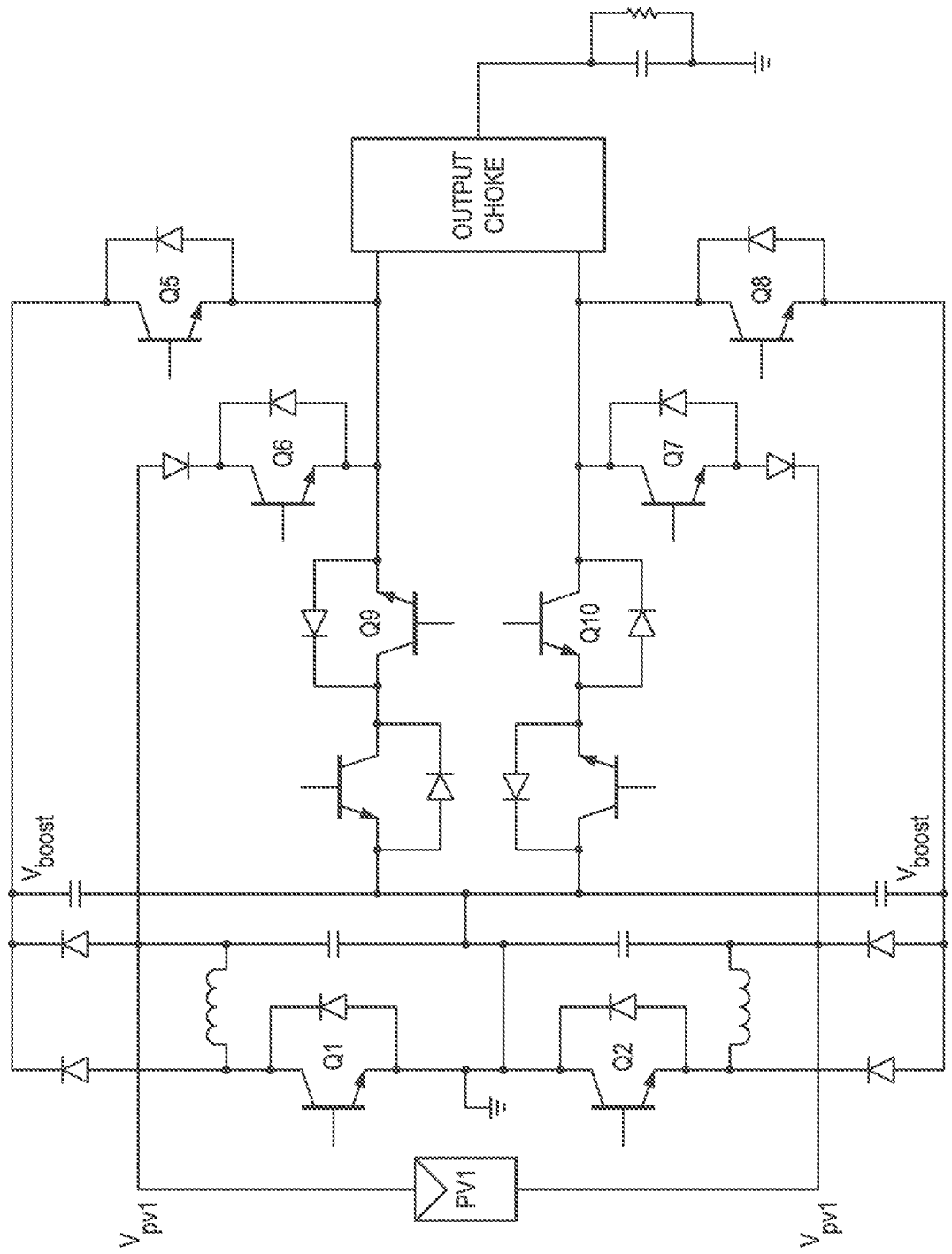
FIG. 22 illustrates a schematic diagram of a multilevel inverter in accordance with another embodiment.

FIG. 22 illustrates a schematic diagram of a multilevel inverter in accordance with another embodiment. The schematic diagram of FIG. 22 is similar to the schematic diagram of FIG. 20A except that the diodes connected in series with Q9 and Q10 respectively in FIG. 20A are replaced by two switches. In addition, the function of the diode D1 of Q20A is replaced by the body diode of Q5.

Figure 23:
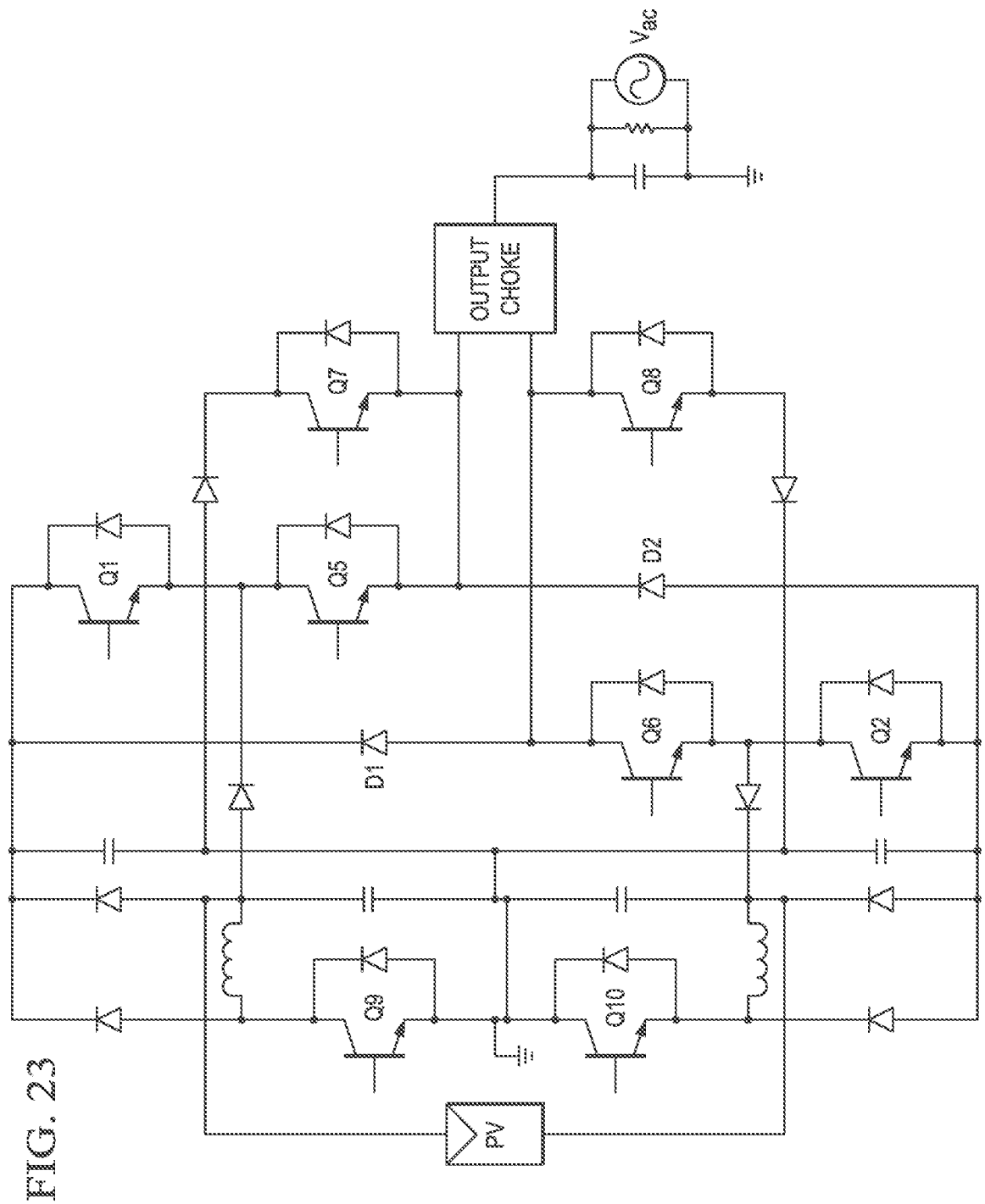
FIG. 23 illustrates a schematic diagram of a multilevel inverter in accordance with another embodiment.

FIG. 23 illustrates a schematic diagram of a multilevel inverter in accordance with another embodiment. The operation of the multilevel inverter of FIG. 23 is similar to the operation of the multilevel inverter of FIG. 4B during an active power process, and hence is not discussed in further detail. In a reactive power process, when Q7 is turned on, the power flows from ground to the diode directly coupled to Q7, and then to the output choke through Q7. Q8's operation is similar to Q7's operation, and hence is not discussed herein to avoid repetition.

Figure 24:
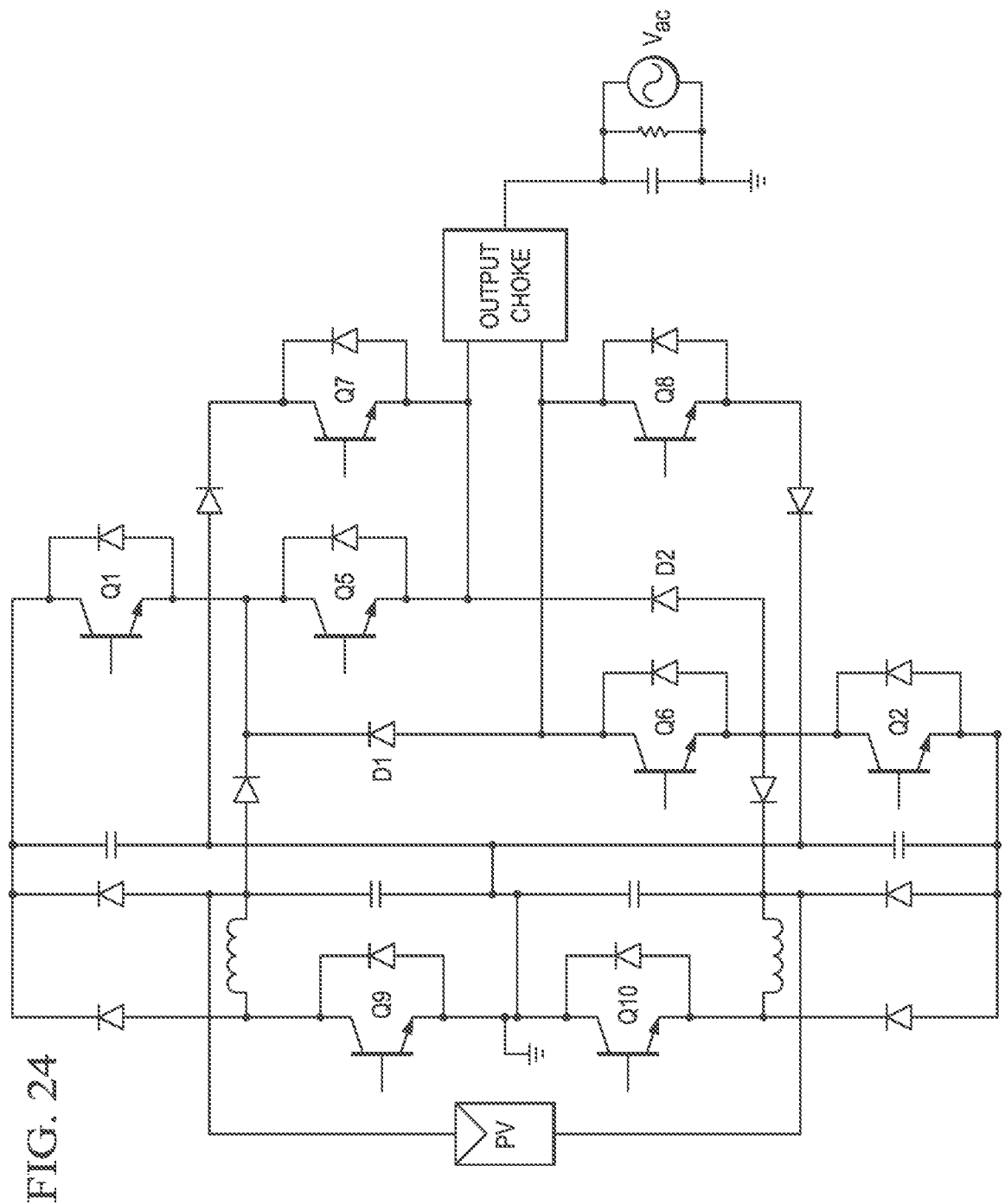
FIG. 24 illustrates a schematic diagram of a multilevel inverter in accordance with another embodiment.

FIG. 24 illustrates a schematic diagram of a multilevel inverter in accordance with another embodiment. The operation of the multilevel inverter of FIG. 24 is similar to the operation of the multilevel inverter of FIG. 23 except that the freewheeling path of FIG. 24 is slightly different from that of FIG. 23. During a freewheeling process, the power flows from ground to the output choke through a conductive path formed by Q1 and D1.

Figure 25:
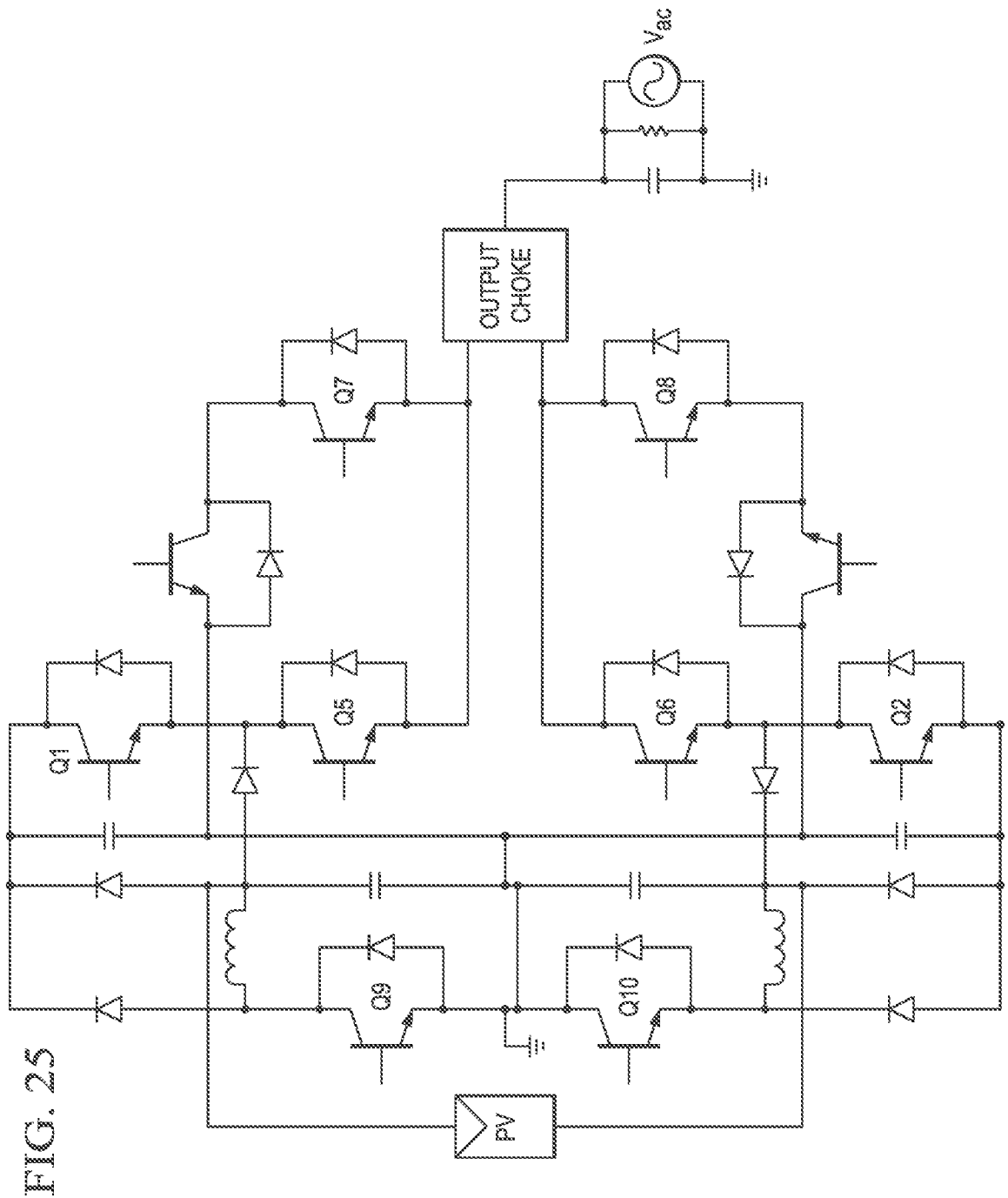
FIG. 25 illustrates a schematic diagram of a multilevel inverter in accordance with another embodiment.

FIG. 25 illustrates a schematic diagram of a multilevel inverter in accordance with another embodiment. The operation of the multilevel inverter of FIG. 25 is similar to the operation of the multilevel inverter of FIG. 22 except that the freewheeling path of FIG. 25 is slightly different from that of FIG. 22. During a freewheeling process, the power flows from ground to the output choke through a conductive path formed by Q5 and the body diode of Q1.

Figure 26A:
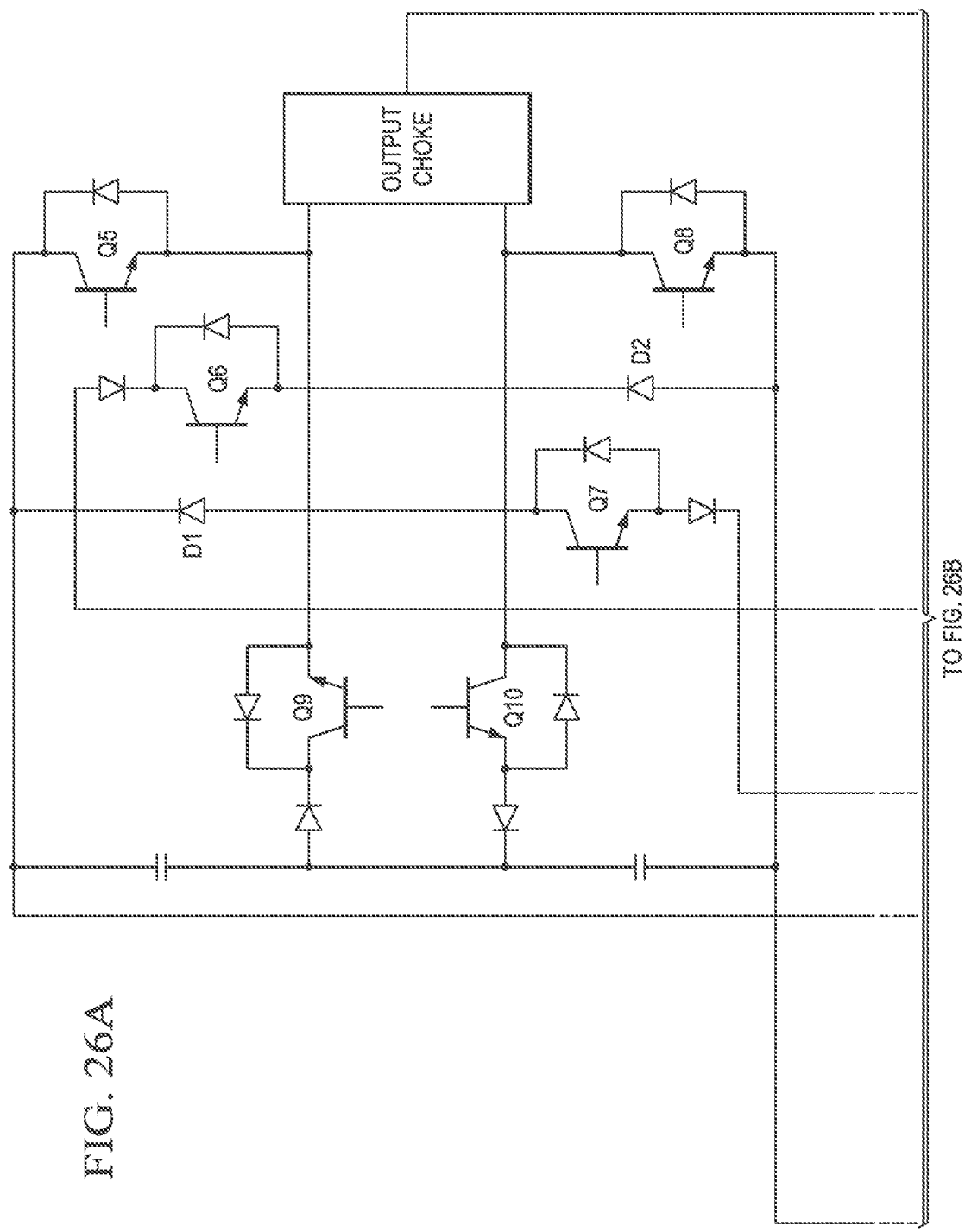
Figure 26C:
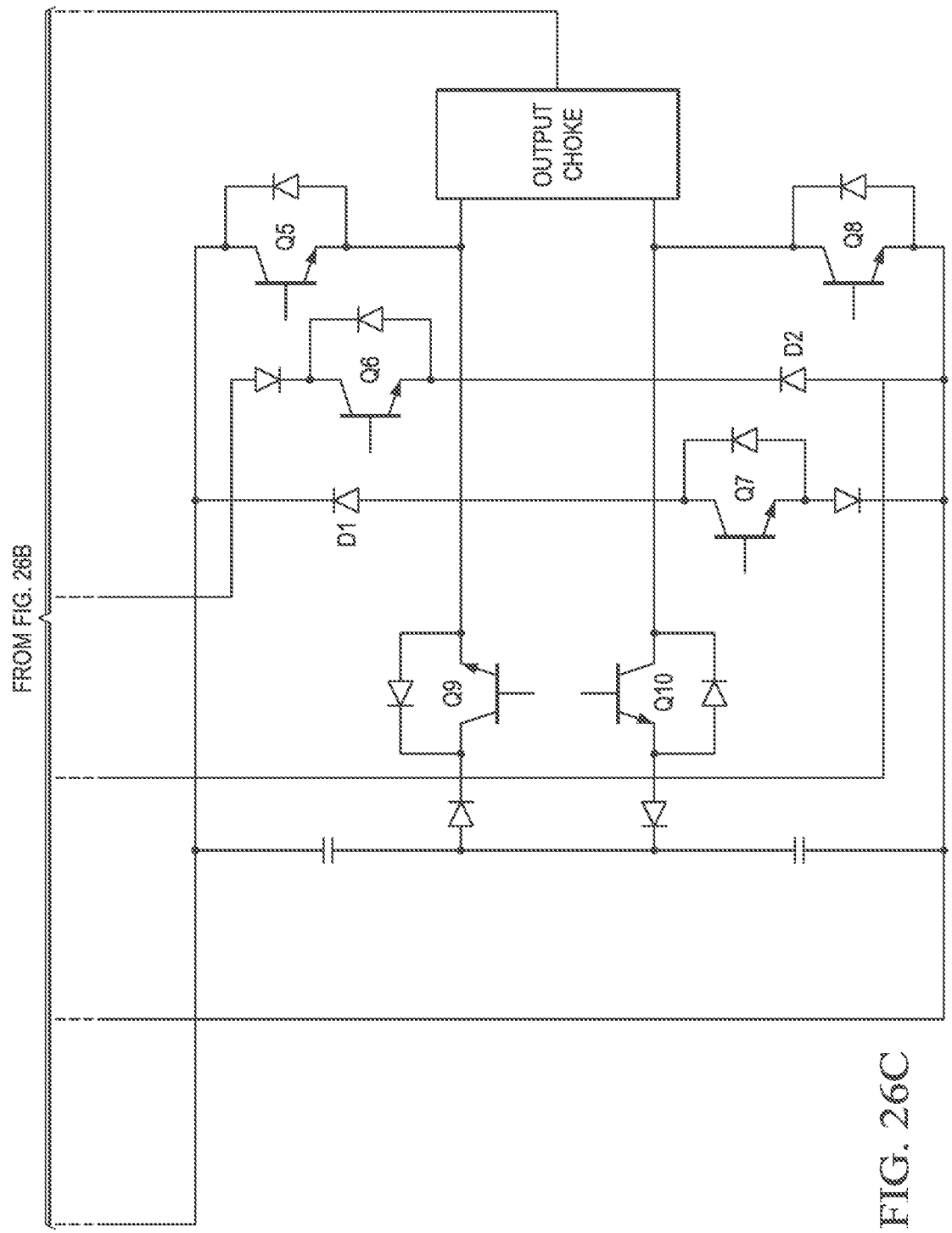

FIG. 26A, FIG. 26B and FIG. 26C illustrate a schematic diagram of a three phase multilevel inverter in accordance with an embodiment. The detailed circuit diagrams of phase A, B and C are illustrated in FIG. 26A, FIG. 26B and FIG. 26C respectively. The multilevel inverter of each phase is of a structure similar to that shown in FIG. 20A, and hence is not discussed again to avoid repetition.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a first five-level inverter connected between a dc power source and an ac grid;
a second five-level inverter connected between the dc power source and the ac grid; and
a third five-level inverter connected between the dc power source and the ac grid, wherein each five-level inverter comprises a first boost apparatus and a second boost apparatus, and wherein at least one of the five-level inverters is configured to:
during a first time period of a first half cycle of the ac grid, switch an output voltage of the at least one of the five-level inverters back and forth between an output voltage of the dc power source and ground; and
during a second time period of the first half cycle of the ac grid, switch the output voltage of the at least one of the five-level inverters back and forth between an output voltage of the first boost apparatus and ground, wherein during the second time period of the first half cycle, the output voltage of the at least one of the five-level inverters is switched between the output voltage of the first boost apparatus and ground in at least two consecutive switching pulses.

2. The system of claim 1, further comprising:
a filter connected between the ac grid and the five-level inverters, and a first input capacitor, a second input capacitor connected in series between two terminal of the dc power source.

3. The system of claim 2, wherein:
a neutral point of the ac grid is directly connected to a common node of the first input capacitor and the second input capacitor.

4. The system of claim 2, wherein:
a neutral point of the filter is directly connected to a common node of the first input capacitor and the second input capacitor.

5. The system of claim 2, wherein:
a neutral point of the filter and a neutral point of the ac grid are directly connected to a common node of the first input capacitor and the second input capacitor.

6. The system of claim 2, wherein:
the filter comprises a first group of inductors and a second group of inductors connected in series, and a group of capacitors connected to common nodes of the first group of inductors and the second group of inductors.

7. The system of claim 2, wherein:
the filter comprises a first inductor connected between the first five-level inverter and the ac grid, a second inductor connected between the second five-level inverter and the ac grid, a third inductor connected between the third five-level inverter and the ac grid, and three capacitors connected to the first inductor, the second inductor and the third inductor, respectively.

8. The system of claim 7, wherein:
a common node of the three capacitors is a neutral point of the filter.

9. The system of claim 2, wherein:
the first five-level inverter, the second five-level inverter and the third five-level inverter form a three-phase multilevel inverter.

10. The system of claim 2, wherein:
the first boost apparatus is configured to operate in the first half cycle of the ac grid, and the second boost apparatus is configured to operate in a second half cycle of the ac grid.

11. The system of claim 2, wherein the first five-level inverter comprises:
a first inverter switch and a second inverter switch connected in series between an output of the first boost apparatus and an input of an inductor-capacitor (L-C) filter;
a third inverter switch and a fourth inverter switch connected in series between an output of the second boost apparatus and the input of the L-C filter;
a fifth inverter switch connected between an input of the first boost apparatus, and a common node of the first inverter switch and the second inverter switch;
a sixth inverter switch connected between an input of the second boost apparatus, and a common node of the third inverter switch and the fourth inverter switch; and
an inverter isolation switch connected between the input of the L-C filter and a common node of the first input capacitor and the second input capacitor.

12. A system comprising:
a first five-level inverter connected between a dc power source and an ac grid through an output filter;
a second five-level inverter connected between the dc power source and the ac grid through the output filter; and
a third five-level inverter connected between the dc power source and the ac grid through the output filter, wherein each five-level inverter comprises a first boost apparatus and a second boost apparatus, and a neutral point of the output filter is connected to a common node of two output capacitors of the dc power source, and wherein the first five-level inverter is configured to:
during a first time period of a first half cycle of the ac grid, switch an output voltage of the first five-level inverter back and forth between an output voltage of the dc power source and ground; and
during a second time period of the first half cycle of the ac grid, switch the output voltage of the first five-level inverter back and forth between an output voltage of the first boost apparatus and ground, wherein during the second time period of the first half cycle of the ac grid, at least one switching pulse is formed by the output voltage of the first five-level inverter switched from ground to the output voltage of the first boost apparatus, and the output voltage of the first five-level inverter switched from the output voltage of the first boost apparatus to ground.

13. The system of claim 12, wherein:
the output filter comprises a first inductor connected between the first five-level inverter and the ac grid, a second inductor connected between the second five-level inverter and the ac grid, a third inductor connected between the third five-level inverter and the ac grid, and three capacitors connected to the first inductor, the second inductor and the third inductor, respectively, and wherein a common node of the three capacitors is the neutral point of the output filter.

14. A method comprising:
providing three five-level inverters connected between a dc power source and an ac grid through an L-C filter, wherein each five-level inverter comprises a first boost apparatus and a second boost apparatus;
switching a voltage at an input of the L-C filter back and forth between a positive dc bus of the dc power source and ground during a first time period of a half switching cycle;
switching the voltage at the input of the L-C filter back and forth between an output voltage of the first boost apparatus and ground during a second time period of the half switching cycle, wherein during the second time period of the half switching cycle, the voltage at the input of the L-C filter is switched between the output voltage of the first boost apparatus and ground in at least two consecutive switching pulses; and
switching the voltage at the input of the L-C filter back and forth between the positive dc bus and ground during a third time period of the half switching cycle, wherein the second time period is between the first time period and the third time period.

15. The method of claim 14, wherein:
a neutral point of the L-C filter is directly connected to a common node of two input capacitors connected in series between two terminals of the dc power source.

16. The method of claim 14, wherein:
a neutral point of the L-C filter and a neutral point of the ac grid are directly connected to a common node of two input capacitors connected in series between two terminals of the dc power source.

17. The method of claim 16, wherein:
the L-C filter comprises a first inductor connected between a first five-level inverter and the ac grid, a second inductor connected between a second five-level inverter and the ac grid, a third inductor connected between a third five-level inverter and the ac grid, and three capacitors connected to the first inductor, the second inductor and the third inductor, respectively.

18. The method of claim 17, further comprising:
a common node of the three capacitors is a neutral point of the L-C filter.

19. The method of claim 14, wherein:
one of the three five-level inverters comprises:
 a first inverter switch and a second inverter switch connected in series between an output of the first boost apparatus and an input of an inverter filter;
 a third inverter switch and a fourth inverter switch connected in series between an output of the second boost apparatus and the input of the inverter filter;
 a fifth inverter switch connected between an input of the first boost apparatus, and a common node of the first inverter switch and the second inverter switch;
 a sixth inverter switch connected between an input of the second boost apparatus, and a common node of the third inverter switch and the fourth inverter switch; and
 an inverter isolation switch connected between the input of the inverter filter and a common node of two input capacitors connected in series between two terminals of the dc power source.

* * * * *